US006243713B1

United States Patent
Nelson et al.

(10) Patent No.: US 6,243,713 B1
(45) Date of Patent: Jun. 5, 2001

(54) MULTIMEDIA DOCUMENT RETRIEVAL BY APPLICATION OF MULTIMEDIA QUERIES TO A UNIFIED INDEX OF MULTIMEDIA DATA FOR A PLURALITY OF MULTIMEDIA DATA TYPES

(75) Inventors: Paul E. Nelson, Woodstock; Christopher H. Anderson, Baltimore, both of MD (US); Ronald M. Whitman, Washington, DC (US); Paul C. Gardner, Escondido; Mark R. David, Sunnyvale, both of CA (US)

(73) Assignee: Excalibur Technologies Corp., Vienna, VA (US)

( * ) Notice: Subject to any disclaimer, the term of this patent is extended or adjusted under 35 U.S.C. 154(b) by 0 days.

(21) Appl. No.: 09/139,290

(22) Filed: Aug. 24, 1998

(51) Int. Cl.[7] .................................................. G06F 17/30
(52) U.S. Cl. .................................. 707/104; 707/3; 707/4; 345/302; 704/231; 704/235
(58) Field of Search ................................ 707/513, 3, 515, 707/4, 100, 102, 104; 704/231, 235; 345/302, 328

(56) References Cited

U.S. PATENT DOCUMENTS

| 4,716,404 | | 12/1987 | Tabata et al. | 340/723 |
|---|---|---|---|---|
| 5,179,652 | * | 1/1993 | Rozmanith et al. | 345/331 |
| 5,202,828 | * | 4/1993 | Vertelney et al. | 707/530 |
| 5,220,648 | * | 6/1993 | Sato | 707/3 |
| 5,241,671 | | 8/1993 | Reed et al. | 395/600 |
| 5,381,158 | * | 1/1995 | Takahara et al. | 345/156 |
| 5,404,435 | * | 4/1995 | Rosenbaum | 707/515 |

(List continued on next page.)

OTHER PUBLICATIONS

Arndt, T., "A Survey of Recent Research in Image Database Management," 1990 IEEE Workshop on Visual Languages, pp. 92–97, Oct. 4–6, 1990.

(List continued on next page.)

*Primary Examiner*—Joseph H Feild
(74) *Attorney, Agent, or Firm*—Fenwick & West LLP

(57) ABSTRACT

A system, method and software product provides for true multimedia document retrieval by receiving multimedia queries containing various types of data, such as text keywords, images, audio or other data types, and processing such queries against a multimedia index that commonly indexes multimedia documents, including any of their multimedia components. The unified index allows query retrieval by evaluation of a query structure which can contain any of the multimedia data types, and operators which can be evaluated on any of these data types. The system indexes multimedia documents by separating them into their multimedia components, and processing each component into a number of tokens. The tokens are stored in the index along with information identifying the documents that contain the token, and reference data describing the position of the token within the documents, and any other data extracted from the multimedia component of the document, such as color, texture, luminance, recognized speech, or the like. During retrieval, a query is decomposed into multimedia components, which are then converted to a set of tokens and query structure including mathematical and proximity operators. Query expansion is used to expand the query structure to include additional tokens corresponding to various ones of input query tokens. Because the multimedia components are all indexed in the unified index, there is no need to process different parts of the query against different indices and databases in order to select documents that best satisfy the query.

68 Claims, 21 Drawing Sheets

U.S. PATENT DOCUMENTS

| | | | | |
|---|---|---|---|---|
| 5,421,008 | * | 5/1995 | Banning et al. | 707/4 |
| 5,428,727 | * | 6/1995 | Kurosu et al. | 707/502 |
| 5,434,966 | * | 7/1995 | Nakazawa et al. | 345/354 |
| 5,579,471 | * | 11/1996 | Barber et al. | 345/326 |
| 5,613,032 | | 3/1997 | Cruz et al. | 386/69 |
| 5,630,121 | | 5/1997 | Braden-Harder et al. | 395/604 |
| 5,655,117 | * | 8/1997 | Goldberg et al. | 707/102 |
| 5,659,742 | * | 8/1997 | Beattie et al. | 707/104 |
| 5,717,914 | * | 2/1998 | Husick et al. | 707/5 |
| 5,742,816 | | 4/1998 | Barr et al. | 395/615 |
| 5,813,014 | | 9/1998 | Gustman | 707/103 |
| 5,832,495 | | 11/1998 | Gustman | 707/102 |
| 5,842,203 | | 11/1998 | D'Elena et al. | 707/4 |
| 5,862,223 | * | 6/1996 | Walker et al. | 705/50 |
| 5,873,080 | * | 3/1997 | Coden et al. | 707/3 |

OTHER PUBLICATIONS

Binaghi, E., Gagliardi, I., Schettini, R. "Indexing and Fuzzy Logic–Based Retrieval of Color Images," IFIP Transactions A–7, Visual Database Systems, II, pp. 79–92, 1992.

Blueridge Technologies, "The Online OPTIX Brochure," OPTIX The Internet Document Management System, http://www.blueridge.com/brochuretext.html, 1997.

Carson, C., Belongie, S., Greenspan, H., Malik, J., "Region–Based Image Querying," CVPR '97 Workshop on Content–Based Access of Image and Video Libraries, pp. 1–8, 1997.

Cawkell, A.E., "Current Activities in Image Processing Part III: Indexing Image Collections," Critique, vol. 4, No. 8, pp. 1–11, May 1992, ALSIB, London.

Chang, N.S., Fu, K.S., "Picture Query Languages for Pictorial Data–Base Systems," Computer, vol. 14. No. 11, pp. 23–33, Nov. 1981.

Chang, S., Shi, Q., Yan, C., "Iconic Indexing by 2–D Strings," IEEE Transactions on Pattern Analysis and Machine Intelligence, vol. PAMI–9, No. 3, pp. 413–427, May 1987.

Charles, S., Scrivener, S., "Using Depictive Queries to Search Pictorial Database," Human Computer Interaction, Interact '90, pp. 493–498, 1990.

Davis, J., "DMA Technical Overview," http://www.parc.xerox.com/istl/members/jdavis/dmaprimer.html, pp. 1–8, May 3, 1998.

Fay, C., "Summary of the DMA Successes at AIIM '98," http://www.aiim.org/dma/d_successaiim98.html, pp. 1–2, 1998.

Goble, C., O'Docherty, M., Crowther, P., Ireton, M., Daskalakis, C., Oakley, J., Kay, S., Xydeas, C., "The Manchester Multimedia Information Systems," IEEE, Multimedia Systems, Interaction and Applications, $1^{st}$ Eurographics Workshop, Chapter 18, pp. 244–268, Apr. 1991.

Grosky, W.I., Neo, P., Mehrotra, R., "A Pictorial Index Mechanism for Model–Based Matching," Data & Knowledge Engineering 8, pp. 309–327, 1992.

Gupta, A., Weymouth, T., Jain, R., "Semantic Queries with Pictures: The VIMSYS Model," Proceedings of the $17^{th}$ International Conference on Very Large Data Bases, pp. 69–79, Barcelona, Sep. 1991.

Kato, T., Kurita, T., Shimogaki, H., "Intelligent Visual Interaction with Image Database Systems, Toward the Multimedia Personal Interface," Journal of Information Processing, vol. 14, No. 2, pp. 134–143, 1991.

Lee, E.T., "Similarity Retrieval Techniques," Lecture Notes in Computer Science, Pictorial Information Systems, pp. 128–176, 1980.

Lee, S., Shan, M., Yang, W., "Similarity Retrieval of Iconic Image Database," Pattern Recognition, vol. 22. No. 6, pp. 675–682, 1989.

Lu, Z., Callan, J.P., Croft, W.B., "Measures in Collection Ranking Evaluation," University of Massachusetts, Technical Report TR96–39, 1996.

"The Need for Document Management System Interoperability," http://www.aiim.org/dma/dma_exec_overview.html, pp. 1–5, 1998.

Manmatha, R. and Ravela, S., "A Syntactic Characterization of Appearance and its Application to Image Retrieval," Proceedings of the SPIE Conference on Human Vision and Electronic Imaging II, vol. 3016, Feb., 1997. San Jose, California.

Manmatha, R., "Indexing and Retrieval Research at the Center for Intelligent Information Retrieval," Proceedings of Symposium on Document Image Understanding SDIUT97, Annapolis, Maryland, Apr. 30, 1997.

O'Docherty, M.H., Daskalakis, C.N., "Multimedia Information Systems—The Management and Semantic Retrieval of all Electronic Data Types," The Computer Journal, vol. 34, No. 3, pp. 225–238, 1991.

Stanchev, P.L., Smeulders, A.W.M., Groen, F.C.A., "An Approach to Image Indexing of Documents," Visual Database Systems, II, pp. 63–77, 1992.

Tamura, H., Yokoya, N., "Image Database Systems: A Survey," Pattern Recognition, vol. 17, No. 1, pp. 29–43, 1984.

Tortora, G., Costagliola, G., Arndt, T., Chang, S., "Pyramidal Algorithms for Iconic Indexing," Computer Vision, Graphics, and Image Processing 52, pp. 26–56, 1990.

Woolsey, K.H., "Multimedia Scouting," IEEE Computer Graphics & Applications, pp. 26–38, 1991.

Wu, V., Manmath, R., Riseman, E.M., "TextFinder: An Automatic System to Detect and Recognize Text in Images," Transactions on Pattern Analysis & Machine Intelligence, CIIR technical report, pp. 1–35, Nov. 18, 1997.

* cited by examiner

Locate Component Tags / Extract Component

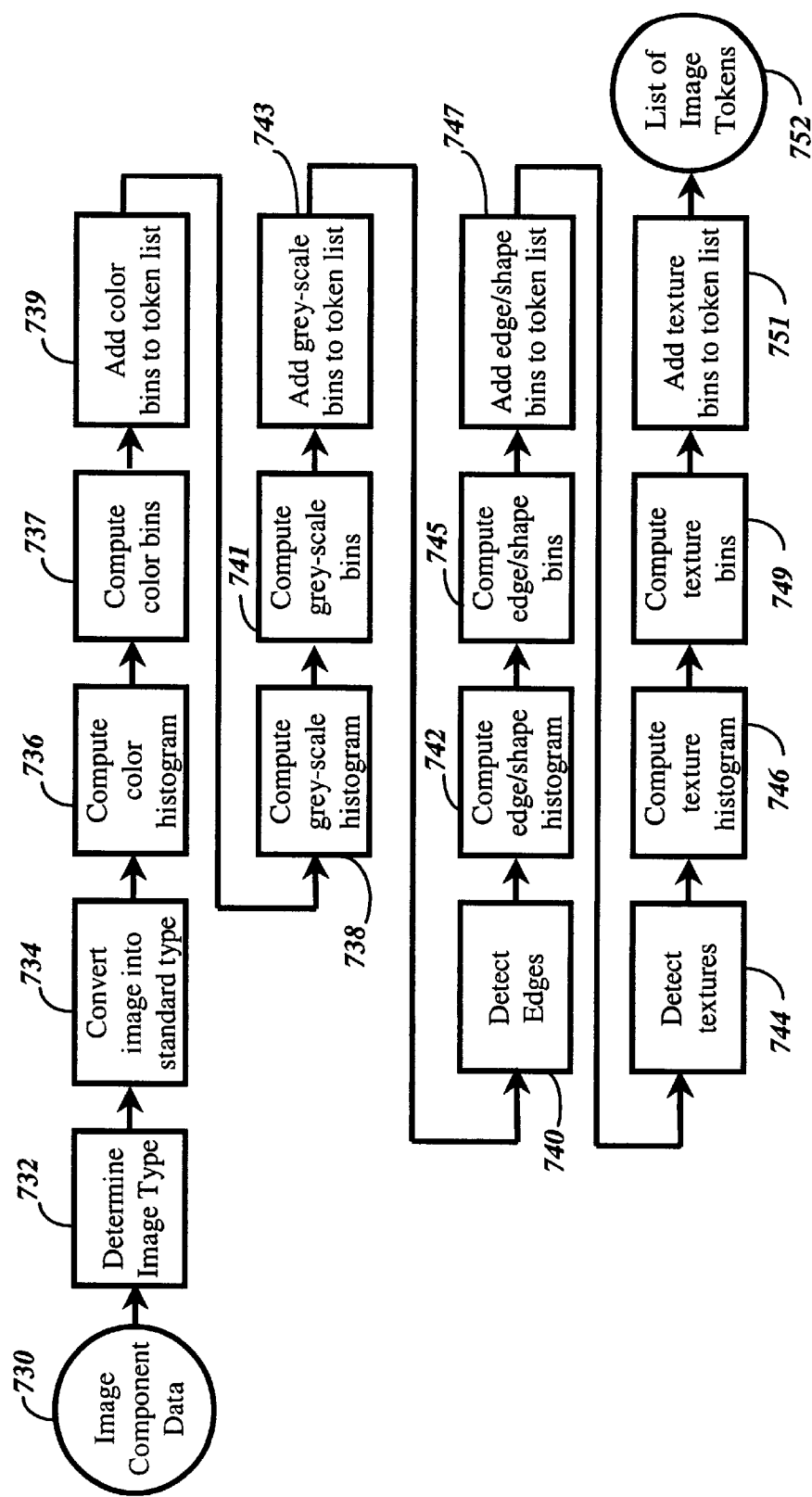

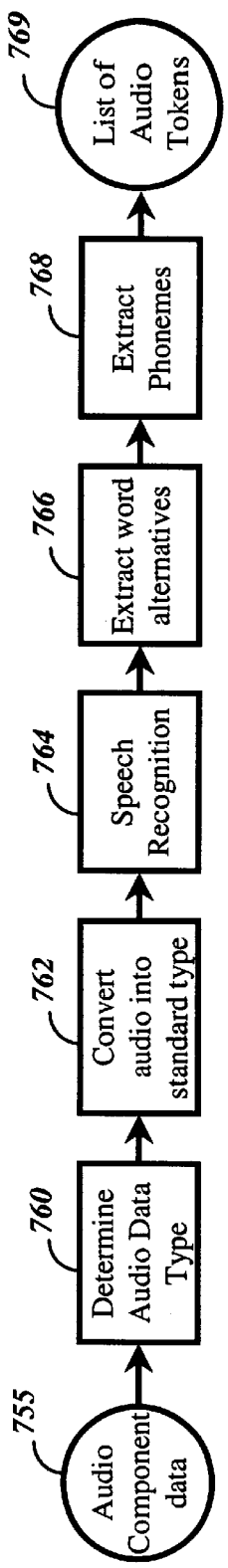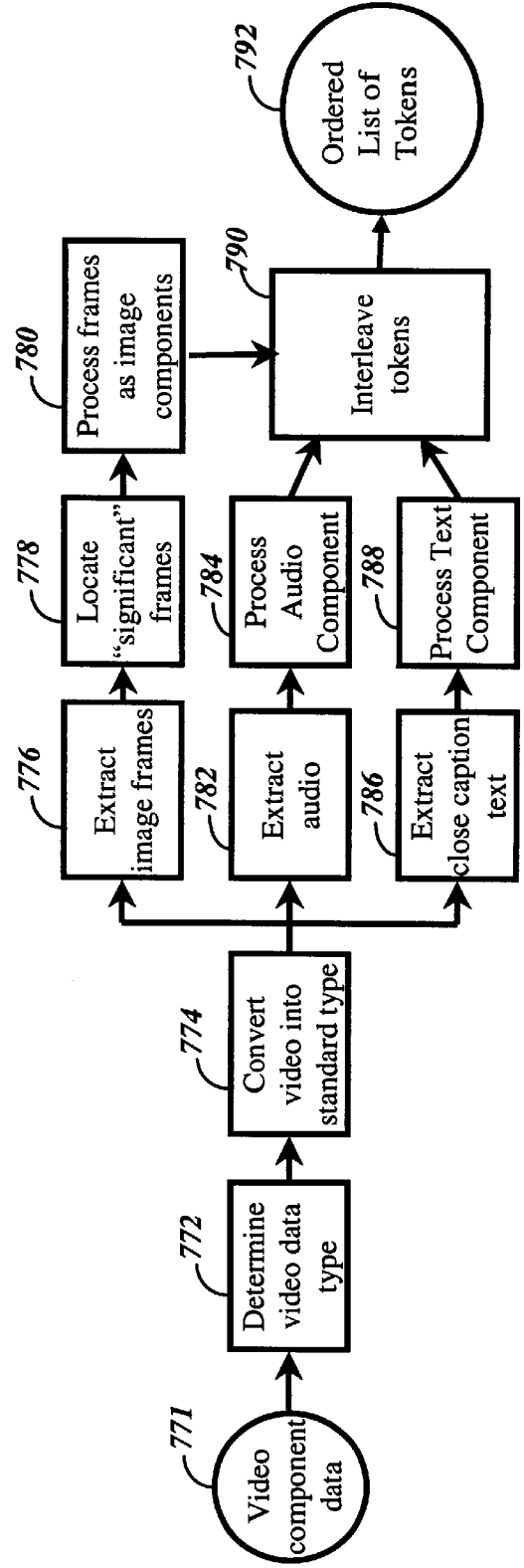

MULTIMEDIA DOCUMENT RETRIEVAL BY APPLICATION OF MULTIMEDIA QUERIES TO A UNIFIED INDEX OF MULTIMEDIA DATA FOR A PLURALITY OF MULTIMEDIA DATA TYPES

BACKGROUND

1. Field of the Invention

The present invention relates generally to information retrieval systems, and more particularly, to information retrieval systems for retrieval of multimedia information.

2. Background of the Invention

Current computer systems enable users to create complex documents that combine both text and images in an integrated whole. In addition, computer users can now insert digitally recorded audio or video directly into such documents, to create rich multimedia documents. In these documents the image, audio, or video components are either directly embedded into the data of the document at specific positions, or are stored external to the document and referenced with referencing data. An example of the former construction is Rich Text Format (RTF) documents, which embed image data directly into the document. An example of the latter construction are HyperText Markup Language documents which use references to external image, audio, or video files to construct the document, where references have specific locations in the text data. Generally, documents in which two or more different types of multimedia components are embedded or referenced are herein termed "compound documents."

Separately, both text and image retrieval databases are known, and generally operate independently of each other. Text retrieval systems are designed to index documents based on their text data, and to retrieve text documents in response to text-only queries. Image retrieval systems are designed to index images based either on image characteristics directly (e.g. color, texture, and the like), or textual keywords provided by users which describe or categorize the image (e.g. "sunset", "blue sky", "red"), and to retrieve images in response to query containing one or more of these items of data. In particular, the images exist independently in the database from any compound document, and the keyword labels typically form merely another column or data attribute of the image, but do not come from text of a compound document itself. Further, the index of images also exists independently in the database from the text or column indexes. There is no single index that considers the whole of the compound document and all of its multimedia components. For example, a conventional, relational multimedia database might use an image table with columns for image ID, descriptive text string, image data, and category label(s). A user would then request an image by specifying some text keywords or category labels which are processed into a query such as:

SELECT ID
  FROM image table
  WHERE TEXT LIKE "sunrise"
  AND IMAGE LIKE "IMAGE ID FOO"
  AND CATEGORY "HISTORY"

Matching on the "image like" operator would then use some type of image data comparison (e.g. matching of color histograms) which is already indexed into the database, along with conventional text matching. However, the result is still merely the retrieval of matching images, not compound documents containing images (let alone other types of multimedia data). An example of an image retrieval system that merely retrieves images in response to image characteristics or text labels is U.S. Pat. No. 5,579,471 issued to IBM for their "QBIC" image retrieval system.

Another limitation of conventional systems is that they do not expand a user's query with multiple different types of multimedia data which is then subsequently to retrieve matching documents. For example, current systems do not take a user's text query, add image data (or portions thereof, e.g. a color histogram) to the query, and then search for documents, including text and images, that satisfy the expanded query.

Accordingly, it is desirable to provide a system, method, and software product that retrieves compound documents in response to queries that include various multimedia elements in a structured form, including text, image features, audio, or video.

SUMMARY OF THE INVENTION

The present invention overcomes the limitations of conventional text or retrieval systems by providing a completely integrated approach to multimedia document retrieval. The present invention indexes compound documents, including multimedia components such as text, images, audio, or video components, into a unified, common index, and then receives and processes compound queries that contain any such multimedia components against the index to retrieve compound documents that satisfy the query.

More particularly, the present invention takes advantage of the fact that compound documents are structured in that the multimedia components have specific positions within the document. For example, FIG. 1a illustrates a sample compound document 100, having text components 101a, an image component 101b, an audio component 101c, and a video component 101d. FIG. 1b illustrates that these components have specifically defined positions within the actual data of the document, such as character or byte offsets from the beginning of the document. The image 101a of the sunset, for example, is at the $244^{th}$ character, the audio recording 101b at the $329^{th}$ character, and the video recording 101d at the $436^{th}$ character. The words of the document obviously also have character offsets. Using this position information, the present invention constructs and maintains a unified multimedia index, which indexes the compound documents and their multimedia components. In particular, each multimedia component is indexed by associating it with each document that contains the component, specifying its position within the document, along with data descriptive of, or desired from, its component content. For example, assume a document contains an image at the $90^{th}$ character position and an recorded audio data at the $100^{th}$ character position. The image would be indexed to reflect its position within the document at the $90^{th}$ character, along with, for example, color histogram data descriptive of color, texture map data descriptive of texture, edge data descriptive of edges or lines, and luminance data descriptive of image intensity. Alternatively, each of these elements of the image may be separately stored in the multimedia index, each with data identifying the document and the position of the image in the document. The audio data would be indexed by speech recognition of words or phonemes, each of which is indexed to reflect the audio's position at the $100^{th}$ character, and further optionally indexed to reflect their relative time offset in the recorded audio. Thus, a single compound document can be indexed with respect to any number of multimedia components (or portions thereof), with the multimedia index reflecting the position of the multimedia component or its portions within the document.

With this multimedia index, the present invention can process true compound queries that include various types of multimedia components, and thus retrieve compound documents that best satisfy the query overall, and not merely satisfy a text query or an image query, as in conventional systems. More particularly, a compound query can include text, image, audio, or video components, and search operators that define logical relationships (e.g. AND, OR, NOT), or proximity relationships (e.g. "NEAR", "within n") between the components. For example, a compound query may require that the word "beach" appear within 10 words of an image of a sunset. The present invention uses the position information in the multimedia index, along with the indexed data (e.g. color data) to find compound documents that have the desired text and have an image with image characteristics (e.g. color, texture, luminance) which match the input query image within the defined proximity relationship.

In one embodiment, the present invention provides a software product which performs the indexing and retrieval tasks, and which stores the multimedia index. The indexing modules of the software product preferably provide a multistage process in which the various multimedia components of a compound document are identified as to their types and their positions within the document, and then each multimedia component is further processed to create indexable data descriptive of the multimedia component. More particularly, a multimedia component is converted into one or more tokens, each with additional reference data. A token represents an abstraction of the multimedia component, and the reference data preferably describes the position of the multimedia component in the document (e.g. its character position or offset) and other type-dependent information useful for comparing instances of the same type of multimedia component, such as color, texture, and the like. The document data may be normalized or otherwise processed to provide tokens that represents more generalized data. For example, date information may be normalized by using tokens that represent date ranges, instead of specific dates; numbers may be normalized by using tokens that represent ranges of numbers; the actual date or number information may be stored as reference data and used during relevancy scoring. The present invention provides processing pipelines for text, audio, images, and video, though any other type of multimedia data may be integrated into the system and method.

The various tokens resulting from the component processing are all stored in the unified multimedia index, even though they represent different types of multimedia data. Thus, text, image, audio, and video, and other tokens are all combined into the same index, thereby facilitating robust retrieval, cross-media relevancy ranking, and sharing of indexing, search, and retrieval modules. In a preferred embodiment, the multimedia index is an inverted index with each token, regardless of its type, associated with a set of documents containing the data which the token represents. Each of these indexed documents in turn contains a list with the position of each occurrence of the token in the document, and the reference data for the occurrence of the token.

The query retrieval modules provide pipeline processing that receives a compound query and generates tokens from it, using the same processing methods as in indexing. These query tokens can be searched using the multimedia index, and compared and scored to selectively retrieve compound documents satisfying the query. During retrieval, the query can be expanded to include additional tokens of the same, or different type as are in the original query. For example, if the query include a text token for the word "sunset" then the query may be expanded to include an image of a sunset, or to include tokens representative of image data, such as a token for the color histogram that is extracted from a sunset image. Similarly, a compound query that includes an image of a sunset may be expanded to include a text token "sunset". These expanded queries are processes against the index to select the best matching documents.

A preferred embodiment for processing the queries uses a coarse and fine-grain scoring of documents, but with the same query. Coarse-grain scoring evaluates the query with respect to only whether a document includes or does not include tokens of the query, essentially a Boolean analysis. Fine-grain ranking uses proximity operators to compare positional information for the tokens, and to compare underlying reference data between query tokens and document tokens.

BRIEF DESCRIPTION OF THE DRAWINGS

FIG. 7c is a flowgraph of a second method of pre-processing image components.

FIG. 7d is a flowgraph of the pre-processing operations for audio components.

FIG. 7e is a flowgraph of the pre-processing operations for video components.

DETAILED DESCRIPTION OF THE PREFERRED EMBODIMENTS

I. Overview of Multimedia Indexing and Retrieval

Figure 1:
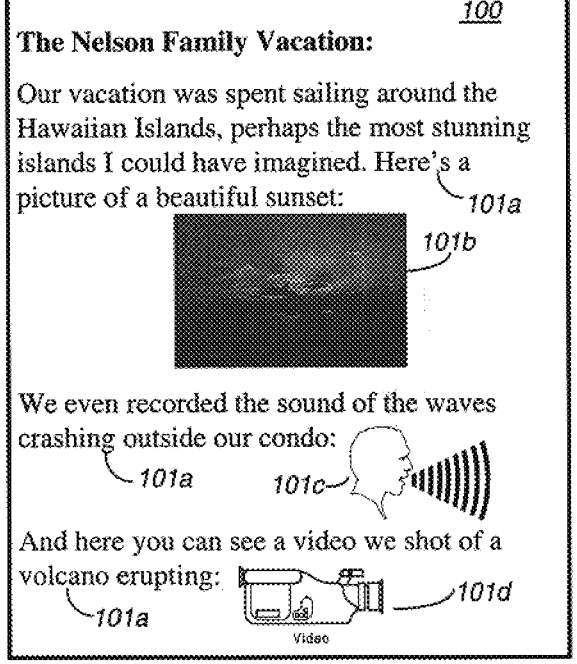
FIG. 1a is an illustration of a compound document containing text, images, video, and audio components.
FIG. 1b is an illustration of the underlying data of the compound document.
Figure 2:
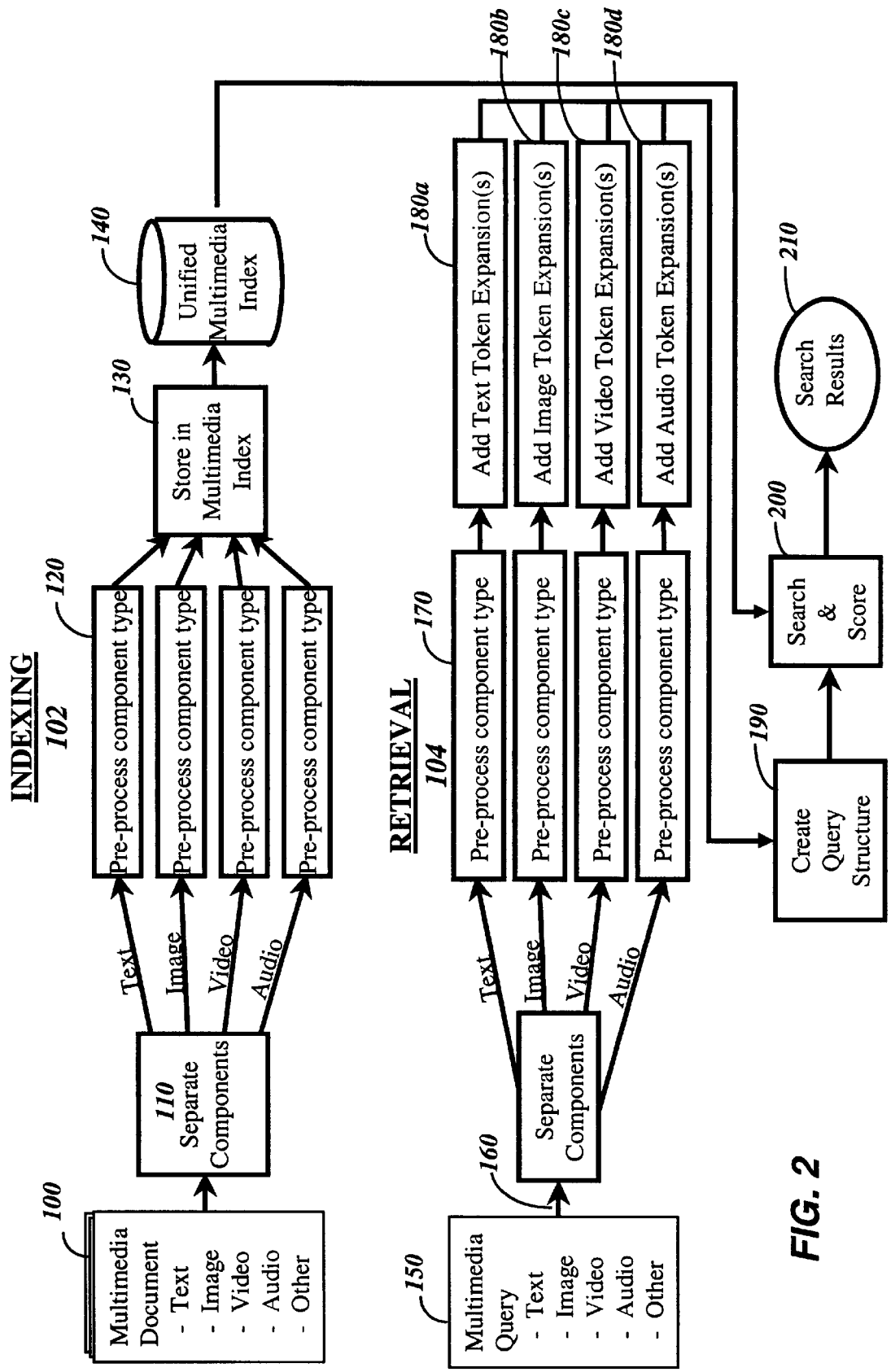
FIG. 2 is a functional model of the present invention.

Referring now to FIG. 2, there is shown a functional model of the multimedia indexing and retrieval features of the present invention. The present invention has two pipelines of operation, an indexing pipeline 102 and a retrieval pipeline 104. These pipelines operate independently, but are shown together in FIG. 2 for ease of explanation. In practice, the indexing pipeline 102 may execute on one computer system, such as a server computer which maintains and serves the multimedia index 140, a database of documents including compound documents, while the retrieval pipeline 104 may execute on one or more other computers. Each of the pipelines is performed by various software modules in one or more software products. The computers may be conventional desktop, mini, or mainframe computers, having one or more processors, addressable memory, hard disks, input devices for user input, and a display for presentation of user interfaces, preferably graphical user interfaces, for accessing the features of the present invention. The software products and their modules are stored in the addressable memory as needed, and executed by the processor to effect the functional features described herein. The present invention may also be used in a web site, with the server software product that includes the indexing and retrieval pipeline components, and maintains the multimedia index and a database of documents, including compound documents. Various web pages would present the user interface for inputting queries, and displaying query results to the clients, such as conventional or modified browsers.

The inputs to the indexing pipeline 192 are multimedia, or compound documents containing various types of multimedia components (though of course the present invention may be used to index documents that have only text, as well as images, videos, or audio recordings by themselves). A compound document may be structured in one of two ways: 1) the multimedia components are specified by reference, or; 2) the multimedia components are embedded directly in the data of the document. An example of the first structure are HTML documents, which incorporate external files by reference. For example, an image may be incorporated with the HTML tag <IMG SRC>, such as in <IMG SRC="http:/abc/image.gif">.

Generally then, the indexing pipeline is as follows. Compound documents are separated 110 into constituent multimedia components of different data types, such as text, images, video, audio/voice, and other data types. Each multimedia component is then processed with type-specific pre-processing 120 to prepare it for indexing. (In this disclosure, reference numbers with letter subscripts (e.g. "120a") are references to the particular reference item, whereas reference numbers without subscripts (e.g. "120") are general references to all items sharing the same number, regardless of subscript). The pre-processing decomposes the compound document 100 into its multimedia components, and creates indexible data for each of these multimedia components. The indexed data for all of the types of multimedia components is then stored 130 in the multimedia index 140.

Figure 3:
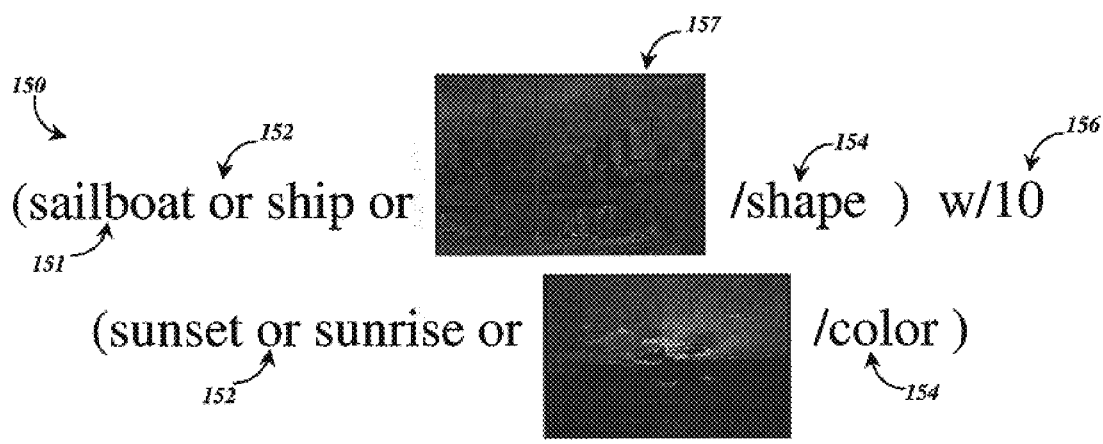
FIG. 3 is an example multimedia query.

In the preferred embodiment, the index data comprises a set of tokens. Each token represents some aspect of a multimedia component in the compound document; the token also has additional reference data that defines at least the position in the compound document of the original multimedia component (or portion thereof) that is associated with the token, and may include the actual, or preferably, processed data extracted from, and representative of the original component. A multimedia component may be characterized by one or more tokens. For example, a text component (e.g., a paragraph of text) may be indexed by a number of tokens, each representing one or more words of the text component, while an image may be indexed by one or more image tokens representing different image attributes, such as color, texture, and so forth. A token may, but need not, be identical to the data that it represents. For example, a text token in most cases will represent an actual text string; e.g. the token "house" will be used to index the word "house". But for non-text data, such as images, a special token may be stored in the multimedia index 140, such as "$IMAGE$", to represent an image in a document; or multiple different tokens may be used, such as "$red$", "$rough-texture$" and so forth. As is apparent, these tokens represent data in the multimedia component or document, but themselves do not actually appear in the document. Thus, those of skill in the art will appreciate that in this disclosure, discussions regarding the appearance, occurrence, or instance of a token within a document are to be understood as meaning the appearance, occurrence, or instance in the document of the underlying data that the token represents. All of the tokens for the different types of multimedia components are indexed together in the multimedia index 140, along with reference data that is extracted from each multimedia component itself Multimedia retrieval operates as follows. The present invention operates most advantageously with a multimedia (or "compound") query 150 specified by the user, which may have one or more multimedia components (such as text portions, image portions, video portions, or audio portions). Preferably these various multimedia components are combined with one or more query operators, which may be default, system supplied operators, or user specified operators, or both. FIG. 3 illustrates an example of a multimedia query 150. In this example, the query 150 includes both text 151 and image 157 components, and a number of query operators 152 defining both logical relationships 152 and proximity relationships 156 between the multimedia components. In addition, in this example, additional query feature operators 154 such as "/shape" and "/color" enable the user to selectively define which aspects of the query images are of interest. The "/shape" operator delimits that portion of the query to images having similar shapes as the sailboat image (where shape is internally determined by edge detection and similar analysis), whereas the "/color" operator delimits that portion of the query to images having colors similar to the sunset image. In practice there may be multimedia component specific feature operators for any characteristic of the multimedia components that are separately indexed, such as color, shape, texture, luminance for images and video, or loudness, frequency, phonemes, and so forth for audio. The compound query 150 may be constructed in a suitable user interface that provides for text inputs, along with selection features for selecting images, audio, and video components (e.g. a drag and drop user interface).

Once the compound query is input by the user, it is separated 160 into its multimedia components, as during indexing. This work may be done by the same software modules as used during indexing, if the retrieval is being carried out on the same computer or system, or by different modules using the same processing algorithms where the retrieval system is separate from the indexing system. As before, each of the components in the query is pre-processed 170 according to its type to generate data representative of the query component. This data is preferably in the same or equivalent form as the data in the multimedia index 140, that is, as tokens with reference data.

As an optional process to increase the robustness of the multimedia retrieval pipeline, type-specific query tokens may be added 180 to any or all of the components that are in the query. Query expansion 180 selects "alternate" tokens to add to the query based on the original query tokens. For example, additional tokens may be used to represent other words similarly spelled to query keywords or that have similar meanings, or other images (or image attributes) of similar shape or color, texture, and so forth. This expansion can either be done by default, or at the discretion of the user via query operators. In addition, query expansion can add tokens of one component type in response to the presence of tokens of another type.

To facilitate this feature, a cross-reference list, or thesaurus, or semantic network may be used to link related tokens together, or the related tokens may be determined algorithmically (e.g. tokens which represent similar colors or similar spellings to those originally found in the query). If using the cross reference list, tokens may be linked with other tokens of the same or different multimedia component type. For example, the token "sunset" may be linked to an exemplary image tokens of a sunset, such as tokens for the color, gray scale, texture, and so forth of a sunset image. When a user presents a query including the token "sunset" the query may be expanded to include tokens representative of colors, textures, and/or luminance of sunset images. Likewise, tokens for the phonemes in "sunset" may be added in order to retrieve more robustly an audio recording describing a "sunset". Also, the phonemes may be used to select words that sound similar to "sunset" and add tokens for these words to the query. In this fashion, these additional tokens will contribute to the search process and increase the likelihood of retrieving compound documents that satisfy the user's original query.

From the generated query components, including additional components from query expansion 180, the retrieval pipeline creates 190 a query structure that organizes the selected tokens along with search operators into an expression that can be used to evaluate or score individual compound documents. This query structure is then processed 200 against the multimedia index 140 to select and score a number of compound documents that satisfy the query. In a preferred embodiment, the selection of documents involves two levels of relevancy scoring. Coarse-grain relevancy scoring is used to select an initial set of candidate documents by evaluating the query structure using data indicative of whether a document contains the query tokens. With the smaller candidate set, a fine-grain relevancy scoring uses the reference data of the tokens to evaluate both proximity operators, and similarity operators. The best scoring documents from the candidate documents form the search results.

These search results 210 are then presented to the user in a suitable user interface that allows the user to retrieve and browse the documents. Presentation may include a succinct listing of document title, author, date, score, document summary, and so forth, as deemed useful to the user.

II. Multimedia Indexing

Separating Documents into Components

Figure 4:
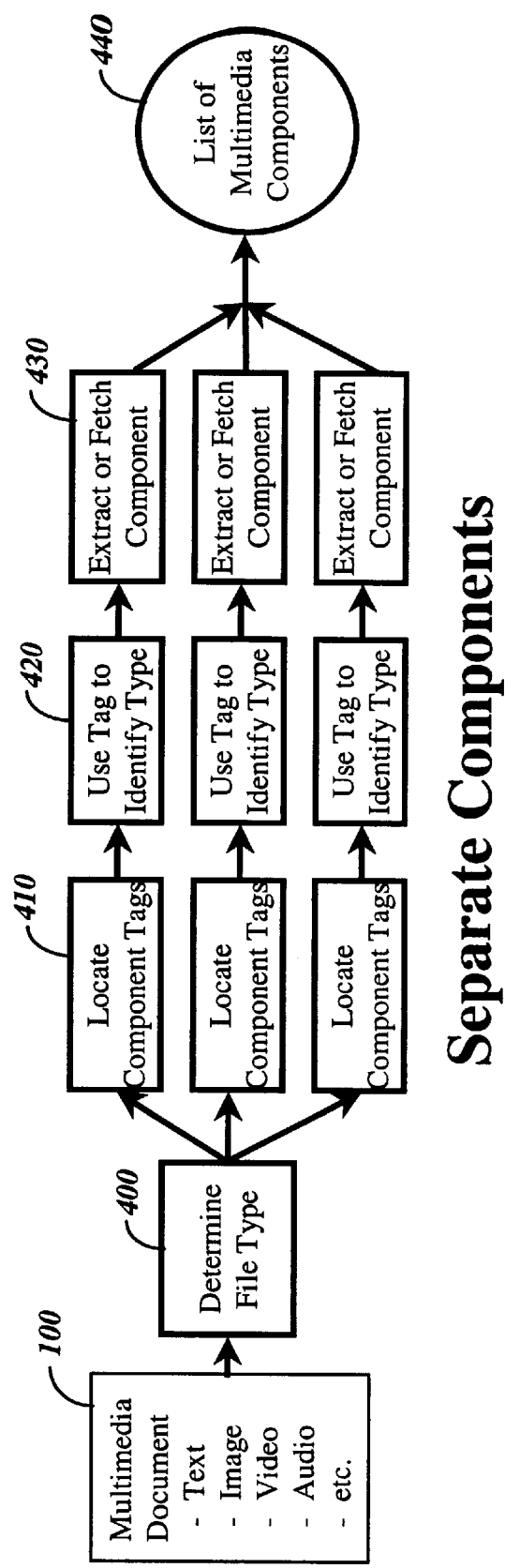
FIG. 4 is a flowgraph of the process of separating a compound document into multimedia components.

Referring now to FIG. 4, there is shown a flowgraph of the first part of the indexing pipeline 102, separation 110 of the compound document into multimedia components. The input to this process is the compound document 100, as described above. This step converts the compound document 100 into an ordered list 440 of multimedia components, each with known type and position within the document. The process is effected by a multimedia component separation module that operates as follows.

The separation process 110 begins by determining 400 the file type of the compound document itself. Those of skill in the art will appreciate that any of a variety of different methods can be used to determine the document type. The present invention supports an architecture that allows additional methods, if identified, to be easily added to the file determination process. In addition, the order in which the methods are employed may vary. Methods for determining file type include:

Document Extension: If present and known, use the file extension of the file. Examples include .htm, .html for HTML documents; .doc for Microsoft Word documents, .txt for ASCII documents.

Mime-type: If the input process provided a mime-type for the document (if the document was downloaded from the World Wide Web, for example), then use this mime-type to determine the document type.

Embedded Labels: Many documents specify the type with a special label at the top of the file. For example, RTF documents have "\rtf" at the beginning. A search may be executed on the first 100 (or other limit) characters for these known embedded labels, and if one is found, it may be used to determine the document type.

Key patterns: Some documents may contain any of a set of key patterns near the document beginning or elsewhere. For example, HTML documents can be identified from the "<HTML>", "<H1>", "<BODY>", "<HEAD>", or "<TITLE>" tags occurring near the top of the document. A search on the first 250 (or other limit) characters for these key patterns may be executed, and if these tags are found, they may used to determine the type of document.

Third-party file type recognizers, such as supplied by the INSO Corporation, of Boston, Mass., provide off-the-shelf recognition, which can be used to determine the type of document.

If no method can determine the type or if the type is not supported, the document is skipped, or assumed to be a default type (such as ASCII text).

Once the file type is known, component tags (or other identifying indicia) of the multimedia components in the document are located 410, and used to identify 420 the component type. The component is then extracted 430, if embedded, or fetched, if externally resident, labeled with its type data, and placed in the ordered list 440 of multimedia components.

Generally, the methods used to locate and extract each multimedia component from a compound document are based on the document type, hence the multiple different processing paths. For example, RTF (rich text format) documents will use one set of methods, while HTML documents may used another, possibly distinct, set of methods. As noted above, some compound document types have the multimedia components embedded in the document (e.g. RTF, MS-Word), while others will need to acquire the data for the component by fetching it from some outside source (e.g. HTML documents). In the former embedded context, the embedded tags in the compound document will typically determine 420 the component types. If so, this information is attached to the component and passed along to the next processing stage. In other instances, the tag will identify the existence, and perhaps file location of a component, but not the type of the component, in which case the component is fetched 430 and analyzed to determine its type.

Locating and Extracting Components

Figure 5:
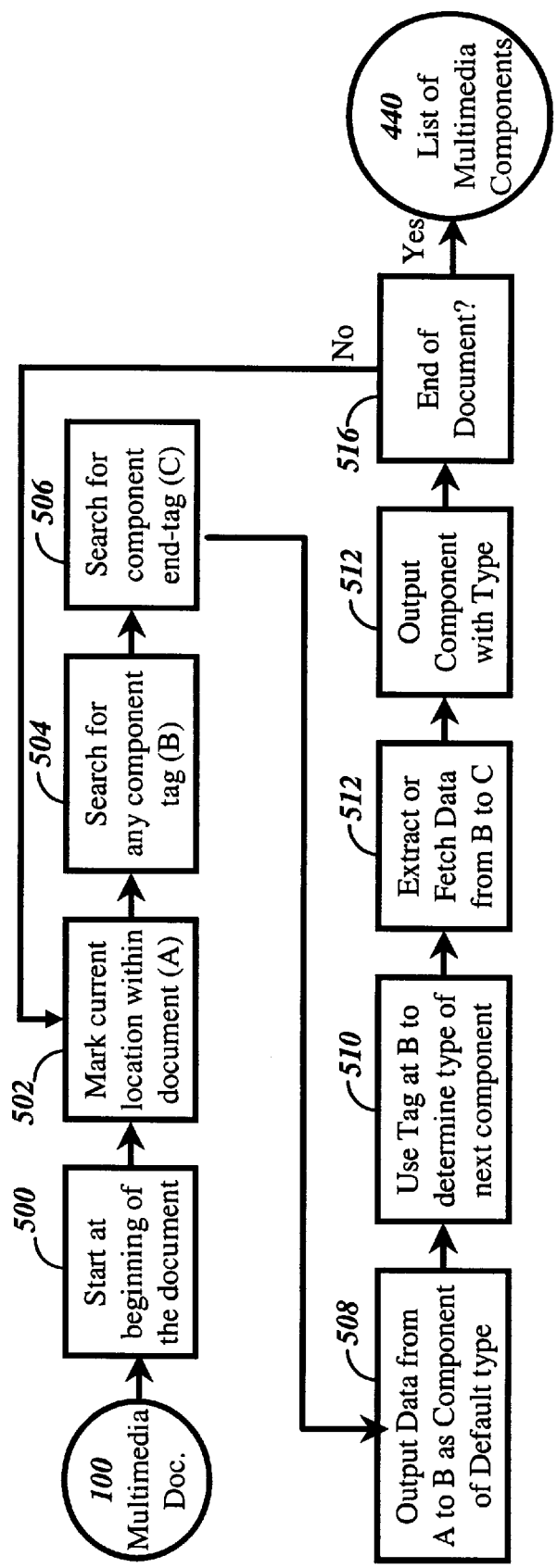
FIG. 5 is a flowgraph of the process of locating component tags and extracting multimedia components for processing.

Referring now to FIG. 5, there is shown a further flowgraph of one simple method of locating multimedia components within a document; other more sophisticated methods can also be employed. Typically, multimedia components are embedded/referenced in a document of a certain type, whether text or other document format. Therefore, all parts of the document which are not specifically tagged as multimedia, are identified as some default type for the document, or are simply skipped.

Accordingly, starting 500 at the beginning of the document, a current position A in the document is marked 502 as the beginning of a component. From this position, the document is searched 504 for a component tag or reference. The position of this tag/reference is marked as position B. Once the beginning of the reference or tag is found, the search 506 is continued until the end tag, or the end of the embedded component, is located. This position is marked as position C.

As an example of component tags, in an RTF document image components start with "{\pict" and end with "}". In HTML documents, images start with "<IMG SRC=" and end in ">". Searching 504, 506 for component tags may involve recognizing tags regardless of embedded spaces or mixed upper/lower case.

Now the data from the beginning of the document at position A to position B is output 508 as a component of the default type for the document, along with the position A data. The tag at position B is used 510 to determine the component type for the component between positions B and C. As noted above, in certain cases (e.g. RTF documents), the component data will be embedded in the document. In other cases (e.g. HTML) the component data may be located on some other system or file, in which case it will need to be fetched from that outside system. Hence the data between positions A and B, along with the data between positions B and C is fetched or extracted 512, and each is output with indicia of its type, and its beginning position, respectively A and B. The position data may be character position, byte offset, word count, or any other useful unit indicating relative location of the component within the document. If the end of the document is not yet reached 516, processing repeats at 502, marking the end of the component beginning at C as the current position.

The output of this process is a list 440 of the multimedia components of the compound document 150.

Component Pre-processing

Figure 6:
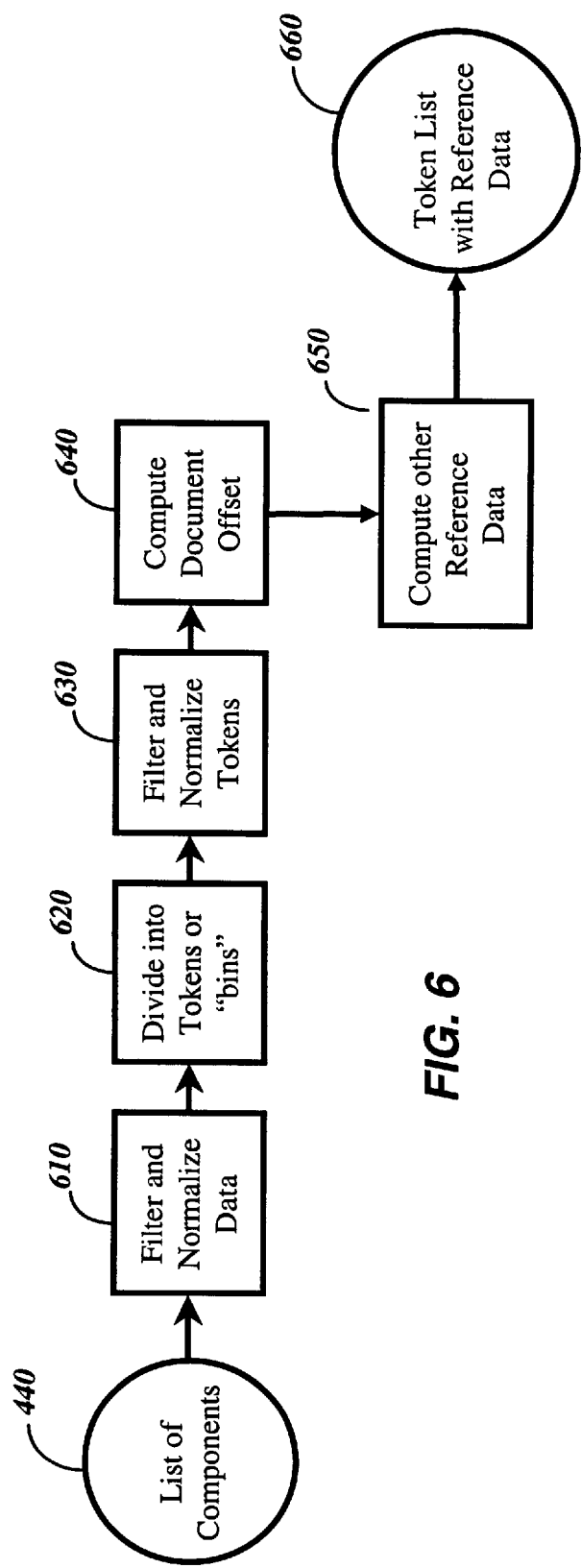
FIG. 6 is a flowgraph of the general process of pre-processing multimedia components for indexing.

Referring now to FIG. 6, there is shown a flowgraph of the general pre-processing operations used to create the indexing data for the multimedia index 140. Specific pre-processing methods are shown in FIGS. 7a–7d for several known data types.

Generally, the purpose of pre-processing is to convert a single block of component data into a list 660 of tokens that represent the original data of the component, each with additional reference data, which tokens will be stored in the multimedia index 140. Thus, pre-processing may be understood to perform a data reduction or abstraction function.

Pre-processing begins with filtering and normalization 610 of the component data, again in a manner that is specific to the component data type. For example, text data may be filtered to remove stop words, and the remaining words normalized to root noun and verb forms; images may be subsampled from their original resolution to a smaller scale.

The filtered component data is then partitioned 620 into tokens. Sometimes these tokens are called "bins", particularly where they are used to represent a range of data values; e.g. a token "$RED$" can be used to represent a range of color values in a color histogram. A single multimedia component can be converted into any number of tokens, including tokens which provide alternative interpretations of the object. For example, an image may be represented by various tokens for its dominant colors, textures, shapes, luminance, and so forth.

The tokens are then further filtered and normalized 630, for example, eliminating tokens for less significant data (e.g. helping verbs, or infrequently appearing color tokens). For each of the remaining tokens, the position of the token within the multimedia component or the document itself is determined 640. This information is useful to perform true proximity searching of tokens, particularly of tokens for different types of multimedia components, and relevancy ranking of documents. In addition to relevancy ranking, the document position may also be used for document highlighting (i.e. identifying in the retrieval user interface the parts of a multimedia document which were matched to the user's query).

Finally, each token created may have computed 650 for it an arbitrary amount of "reference data". Reference data typically identifies the position of the token within the multimedia document, plus any additional data required for fine-grain relevancy ranking for the object (usually determined by the type of the object). This additional data is again dependent on the type of the multimedia component.

FIGS. 7a–7d illustrate flowgraphs for one set of embodiments for pre-processing of text, image, audio, and video components.

Text Pre-processing

Figure 7A:
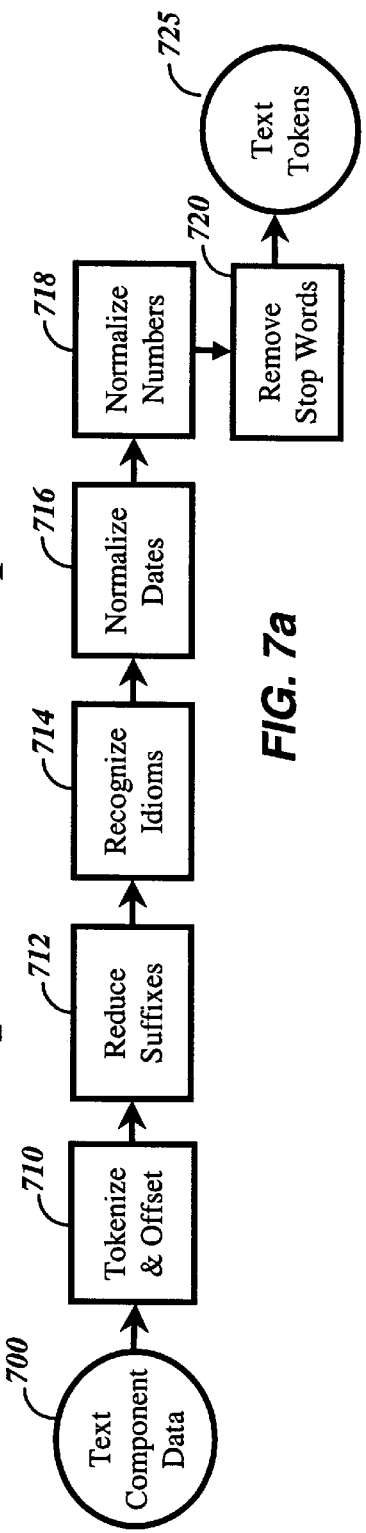
FIG. 7a is a flowgraph of the pre-processing operations for text components.

Referring to FIG. 7a, one embodiment of text pre-processing is illustrated. The text pre-processing operations are effected by a text pre-processing module. The input to text pre-processing is a text component; the output is a set 725 of text tokens with reference data. Text pre-processing is as follows:

Tokenize & Offset 710: This operation divides up a block of text into tokens, one per word in the block, using word separators such as spaces, punctuation, and the like. For each token, the document offset of the token is computed as the number of characters from the beginning of the document to the start of the token within the text component. The document offset is considered to be part of the token's reference data. Additionally, words may be converted into all upper case letters to allow indexing and querying, and accented letters may be converted to unaccented forms.

Reduce suffixes 712: This operation reduces words to simpler forms or root words to reduce variability of the tokens in the indexes. For example, "babies" is reduced to "baby"; "running" is reduced to "run". However, special cases may not be reduced, for example, "AIDS" will not be reduced to "AID". These special cases are identified in a dictionary.

Recognize idioms 714: Special sequences of tokens, called idioms, are recognized by matching the sequences against a dictionary of special sequences. Once a sequence is recognized, a new token (representing the entire sequence) is added to the list of tokens 770, in place of (or in addition to) the original tokens.

Normalize dates 716: Dates of a variety of formats are normalized to a single format. Further, the number and variety of date tokens is reduced into date range "bins" Exemplary date ranges include using one bin per quarter per year. For example, all dates from 1/1/1998 to 3/3/1998 could be indexed as the same token "Q1-1998". Other date range bins may be monthly, or yearly bins, and any combinations of these various (or other useful date ranges). Additional reference data stored for each date token identifies the exact date of the token specified in the text component, thereby preserving the original data for use during retrieval to compare the original date with a date submitted in a query.

Normalize numbers 718: Numbers are normalized in a similar fashion, using tokens representing bins of numbers. Numbers are first reduced to bins, for example, 1–2, 2–4, 4–8, 8–16, and so on, and 0.5–1.0, 0.25–0.5, 0.125–0.25, 0.0625–0.125, and so on. For example, the number 9.32 would be indexed into the 8–16 bin. Then the actual value of the number (9.32) is stored in the reference data for this token, in addition to the offset of the number within the document. Other bin ranges may also be used (e.g. 0–9, 10–99, 101–999, and so on). The choice of what binning methods are used can be made based on the variety, frequency, or distribution of numbers in the documents being indexed.

Remove stop words 720: Finally, certain small tokens (such as articles, auxiliary verbs, prepositions, and the like) may be stripped from the list of tokens 725.

The processing operations above may be performed in other orders than that described, as desired for computational efficiency.

Image Pre-processing

Figure 7B:
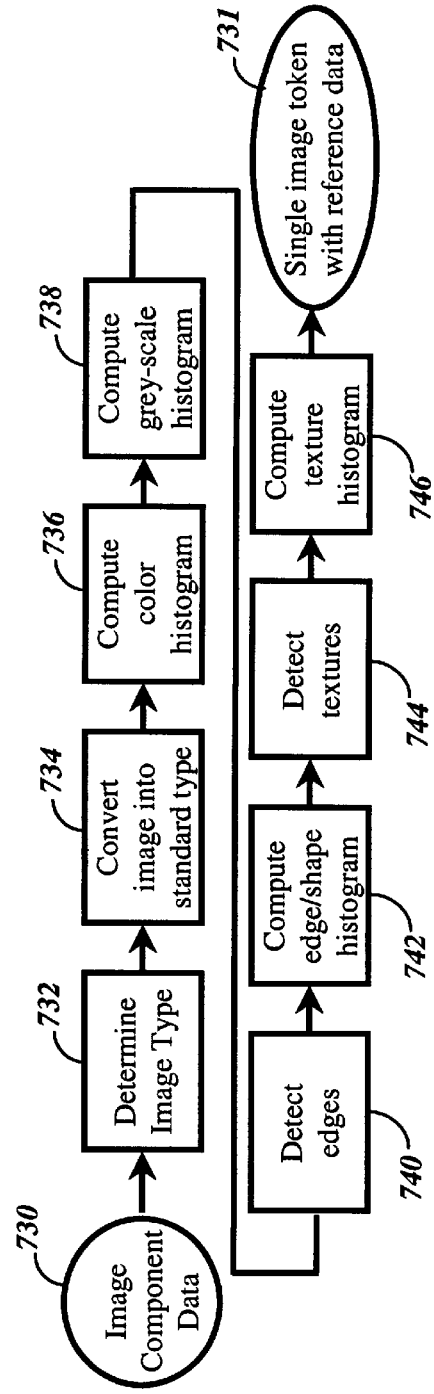
FIG. 7b is a flowgraph of one method of pre-processing image components.

FIG. 7b illustrates one method of image pre-processing, as performed by an image pre-processing module.

In this embodiment generally, an image component 730 is converted into a single token 731 representing the entire image. The image reference data can be the combination of the document offset, the color histogram, the gray-scale histogram, the edge/shape histogram, and the texture histogram.

Determine file type 732: First, the type of image is determined (GIF, TIFF, JPEG, and so on). This can be done with processes similar to those for determining the file type of the multimedia document. For example, file extensions or internal data may be used to determine image type.

Convert to standard image type 734: Once the file type is known, it is converted into a standard internal representation. This may involve conversion of file type to a standard file type, such as GIF or the like. In addition, the size of the image may be standardized and reduced to a common size. In a preferred embodiment, images are subsampled to a 96×96 bit map image. This normalized image is used in further processing steps.

Color histogram 736: A color histogram for each image is defined, using a number of color bins for ranges of colors, each bin having a bin count. The color histogram is then reduced to include only a subset of the top most significant colors, and then the entire histogram is stored in the token's reference data. The subset may be selected as a fixed number of bins with the highest bin counts, or by selecting the highest count bins until the Nth selected bin has a fixed percent (e.g. 50%) lower bin count than the $1^{st}$ bin, or until the Nth bin has a fixed percent (e.g. 25%) lower bin count than the (N−1)th bin.

Gray-scale histogram 738: A gray-scale, binned histogram of the image luminance is defined. For each pixel in the image, the intensity is determined and a bin count for the corresponding intensity bin is incremented. The gray-scale histogram is reduced to include only the most significant intensities, and then the entire histogram is stored in the token's reference data. The selection of histogram bins may be implemented as variously described above for selecting color bins in the color histogram.

Edge Detection 740 and Edge Histogram 742: An edge shape histogram is defined, having bins representing sequences of neighboring edges which define parts of shapes. For example, a sequence could indicate a right-angle corner, or a straight edge, or a gentle curve. Bins thus represent the relative sharpness of the sequence being defined, in such a way as to be rotationally independent (i.e. a right-angle corner would be a right-angle corner now matter how the image is rotated). Edges in the image are sharpened 740 using standard edge detection algorithms. Then, for each edge fragment, the shape of the fragment along with neighboring fragments is histogrammed 742, incrementing the bin count of the corresponding bin. Especially strong edges (which have sharp edges between highly contrasting colors) may count for more in the histogram than weak ones, i.e. multiple increments in the corresponding bin. The entire edge histogram may then be stored in the reference data of the token.

Texture Detection 744 and Texture Histogram 746: Textures in the image can be determined 744 by scanning across the image for high frequency variations in the image, and histogramming 746 the variations based on the size and frequency of the spikes. The entire texture histogram may then be stored in the reference data of the token.

The result of this process is the creation of a single image token 731 with the combined entirety of the reference data. For example, the token that is used in the multimedia index 140 may be "$IMAGE$" (or any other useful, distinct token), with the reference data as described.

FIG. 7c illustrates an alternative embodiment of image pre-processing. In this embodiment, the image component is converted into a set 752 of multiple image tokens, instead of a single token. The separate tokens represent different image characteristics of the image component, such as color content, gray-scale content, texture content, and edge content, as computed above. This option converts the image component data into a list of tokens which represent the most prevalent characteristics of the image. Each token has its applicable reference data, as described above.

The computation of the various types of histograms is the same as described with respect to FIG. 7b. Once each histogram of a specific type (e.g. color) is computed, the strongest bins in that histogram are extracted 737, 741, 745, 749 and indexed 739, 743, 747, 751 as separate tokens. For example, there would be separate tokens for each of the N highest-count color bins, gray scale bins, texture bins, and edge bins. Each token would have as its reference data the position offset of the image in the document and the actual bin count for the corresponding bin which the token represents. In addition, a single token with the complete representation of all histograms in the reference data is also added to the list of tokens. This single token would be the same as is created with respect to FIG. 7b.

Audio Pre-processing

Referring to FIG. 7d, there is shown a flowgraph of the audio pre-processing operations, as effected by a audio pre-processing module. The input to audio pre-processing is an audio component 755; the output is a set 769 of audio tokens with reference data.

Determine audio data type 760: First, the type of the audio data is determined. Methods such as those previously described can be used to determine the type of data (i.e. WAVE, MIDI, and the like), such as file extensions, embedded data, or third- party recognition tools.

Convert to standard format 762: Next, the data is converted into a standard format. This may include the file format and normalization of the frequency range and sampling frequency.

Speech recognition 764: Third-party speech recognition software is used to recognize words in the audio data. These words become the tokens of the audio data. In a preferred embodiment, the recognized words are indexed with the same tokens as are words in text documents. Suitable speech recognition software includes the "Naturally Speaking Software Developer Kit" from Dragon Systems, Newton, Massachusetts. The conversion operation 762 is preferably configured to provide the proper file format as needed by the speech recognition software.

Speech recognition software may be configured to output confidence factors for each word, which identify a confidence level that the recognized word is correct. This confidence data, along with the document offset of the audio data is stored as the reference data of the token. Also added to the reference data is the time offset within the audio data where the word was spoken. This produces a very fine-grain description of precisely where the audio data associated with the word token is within the compound document. This detailed information may be particularly useful during relevancy scoring. For example, assume the user is searching for the text data "sunset" and the audio data "golden". A document with an audio recording immediately following the word "sunset" and having the recorded word "golden" immediately near the beginning of the audio is considerably different from, and has much higher relevancy (and should score higher) than another document with the same recorded word at the end of a 10 minute recording, where it may have nothing to do with sunsets.

Extract Word Alternatives 766: Some speech recognition systems optionally supply alternates for recognized words, in case the word is improperly recognized. These alternates can be added to the list of tokens for the word, each with a confidence factor stored in the reference data.

Extract Phonemes 768: Finally, in some instances a recorded word is not recognized at all or the confidence factor is very low. In this case, the speech recognition system preferably produces a list of phonemes, each of which will be used as a token (from a predefined list of standard phonemes). The reference data for these phoneme tokens is the confidence score of the phoneme, and the position of the phoneme within the audio data. Again, this level of reference data facilitates relevancy scoring for the audio data with respect to other audio or other multimedia components.

Video Pre-processing

FIG. 7e illustrates an embodiment of the processing flow for pre-processing of video components. These operations are executed by a video pre-processing module. The input to video pre-processing is a video component 771; the output is a set 792 of image tokens, text tokens, and audio tokens.

Generally, video data is comprised of a running stream of three data types: image frames, audio data, and (optionally) closed caption text. These various data streams are separated, tokenized and processed, and then interleaved to form a sequence 792 of tokens.

Determine video data type 772: The format and data type of the video component is determined, for example, using file extensions or internal data.

Convert video to standard type 774: The video format is converted, if necessary, to a standard format, including file format, image size, and so forth.

The audio data is extracted 782 and processed 784 with the same processes for audio data as described with respect to FIG. 7d.

The closed caption text data is extracted 786 and processed 788 with the same processes for text data as described with respect to FIG. 7a.

The video data is a sequence of image frames, which are extracted 776 from the overall video data. Since it is usually impractical to process all frames, it is preferable if "significant" or "key" frames are identified 778. These frames are those where there are cuts, pans, or fades from one scene to another, and the like. Any of various scene change detection algorithms may be used to identify significant frames. Alternatively, various types of histograms for the frames may be successively generated and compared, with significant differences between neighboring frames indicating a significant frame.

Once significant frames are detected, each of these frames is processed 780 using the various image pre-processing methods described above with respect to FIG. 7b or 7c. For each significant frame then, there will be one or more tokens representative of the image content of the frame, and thus many such image tokens for the entire video sequence, along with the audio (if any) and text tokens (if any).

All tokens generated by these processes will contain an offset of the token within the video data, typically in the form of a time code from the start of the video data, or a frame number. Therefore, the tokens from the various processes can be interleaved 790 into a single list of tokens, ordered by time code. Interleaving is useful to reduce the complexity of index storage methods, which often require that tokens be submitted in strict document order, regardless of the type of token. This is especially the case if two methods produce different instances of the token, for example, the same word may be produced by speech recognition as well as being extracted from the closed caption text. Typically, closed caption text is given preference over speech recognition, and so if closed caption text is present, the tokens from the speech recognition system may be ignored.

In another embodiment, the present invention is used to transform video data directly into compound documents, which are then indexed in the multimedia index 140. A video recording is processed to identify significant frames of image data, which are processed into image tokens. The audio data of the video is processed to generate audio tokens of recognized speech. Closed caption text (if any) may alternatively be used if present instead of the speech recognition output to generate text tokens. All of these various types of tokens are then interleaved according to their time offset in the video, to form a compound document. In this tokenized form, the compound document of the video can be directly indexed. The retrieval pipeline 104 then operates to search and retrieve the video as any other compound document.

Update Multimedia Index

Figure 9:
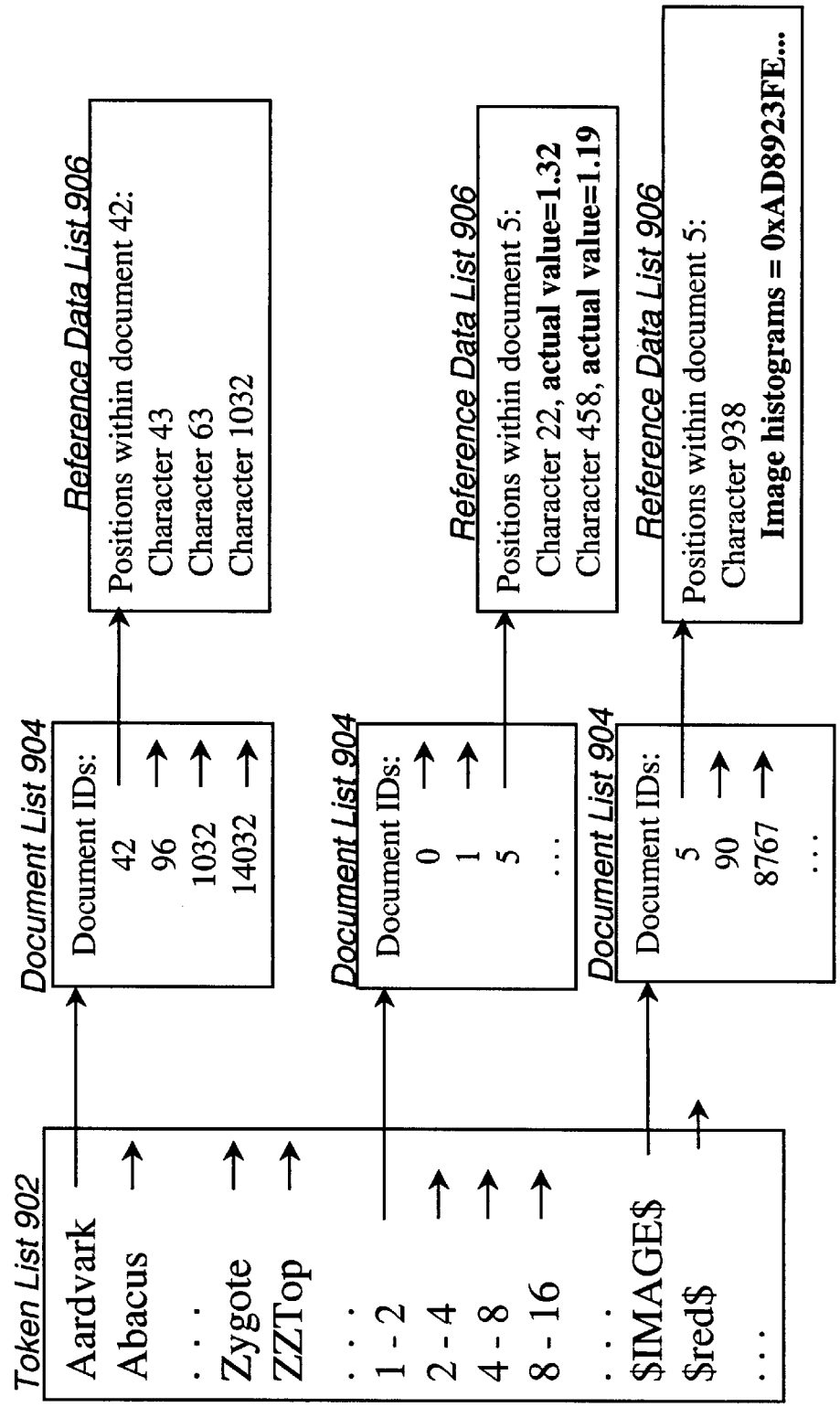
FIG. 9 is an example of the organization of the unified multimedia index.

As a result of the entire pre-processing flow, a list of tokens of various types is produced, preferably ordered to reflect the positioning (or timing) of the original data in the compound document. This set of tokens is now updated into the multimedia index 140. FIG. 9 illustrates an instance of the multimedia index 140 with example data. The multimedia index 140 is stored on a computer readable medium, such as a high performance server computer, with sufficient memory and storage capacity.

The tokens are expressed in a set of symbols so that there is no confusion between tokens from different multimedia components. For example, the string "red" is used as a token for the word itself, while the string "$RED$" may be used as the token for the color bin range associated with red images. Similarly, distinctive tokens are defined for gray-scale values, textures, phonemes, and other multimedia data types, as needed. Where images are indexed into a single image token (See FIG. 7b) then a single "$IMAGE$" (or other distinct token) may be used.

All tokens contain an offset or position of the token within the compound document, and further, where applicable, an offset of the token within the multimedia component itself. This second offset is most useful for audio and video data. For computational convenience, tokens can be maintained in the multimedia index 140 ordered by these offset values, with respect to their source compound document.

Figure 8:
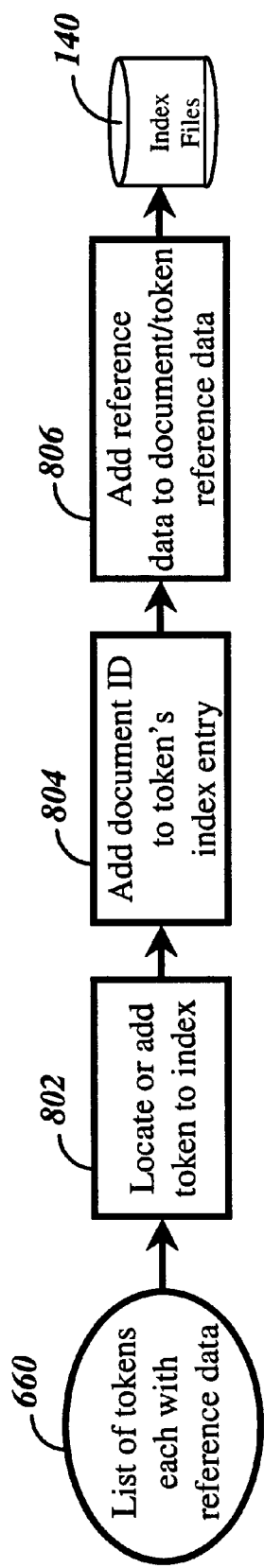
FIG. 8 is a flowgraph of the process of indexing multimedia components into the multimedia index.

FIG. 8 illustrates the flowgraph of the process of updating the multimedia index 140. The input to this processing is the combined list 660 of the token lists 725, 731, 752, 769, 792 for the various types of multimedia components.

First, each token is checked 802 to determine if it already exists in a list 902 of all unique tokens in the multimedia index 140. If not, a new entry is added to the list 902 of unique tokens.

Second, each document has a unique document ID (which can be any ID, but for computational convenience is usually an ordinal number for the document). Each token in the index is associated with a list 904 of all the document IDs which contain the token. Beginning with the first token in the token list 660 for the current document 150, and continuing in sequence with each token therein, the document ID of the current document 150 is added 804 to the list 904 of document IDs associated with that token. Checking is done to see if the document ID of the current document has already been added to the list 904 (which happens when a token appears at least twice in the token list 660 for the current document). In this case, the current document ID need not be inserted again.

Third, each document ID in the multimedia index 140 contains a list 906 of reference data, for each occurrence of a distinct token within the document. The reference data for the current token is then added 806 to the list of reference data for the current token, within the current document ID.

Referring then to FIG. 9, as a specific example, suppose a particular document, document 5, contains the text string "1.19" at the 458$^{th}$ character, and a image of a red ball at the 938$^{th}$ character. Processing of this document yields the tokens "1–2" with reference data "offset=458 actual value= 1.19", and the token "$red$" with reference data "offset=938 image histogram=0xAD8932FE . . . ". These tokens are to be added to the multimedia index 140. Since the token "1–2" is already in the index in list 902, the current document ID (number 5) is added to the document list 904 for the token "1–2", and the reference data (offset=458 and value=1.19) is added to the reference data list 906 for this document ID. Next the token "$red$" is also in the token list 902, and so document ID 5 is added to the document list 904 for this token, and the reference data of position and image histograms is added to the reference data list 906.

III. Multimedia Retrieval

As described above with respect to FIG. 2, the multimedia retrieval pipeline 104 operates independently of the indexing pipeline 102, and may be executed from client computers (potentially remotely located) or other server computers that communicate with a host server computer that maintains the multimedia index 140. In this scenario, each remote computer stores software products that execute to effect the processing operations used during retrieval. Alternatively, client computers may invoke the host computer to perform some or all of such processing, and may effect the remaining processing themselves, such as presentation of search results to the users.

The retrieval pipeline 104 converts an input compound query 150 into a query structure that includes a number of tokens and one or more query operators. A query separation module is preferably used to separate the query into components using, where appropriate, the same component separation and location operations, as described above, to identify the sequence and type of multimedia components in a document. Query processing modules then execute the various pre-processing operations to create an ordered list of query tokens. Following optional token expansion, a query structure is created, combining the token list with search operators, and evaluated against the multimedia index 140. This evaluation process preferably includes coarse- and fine-grain scoring stages, and final presentation of ranked compound documents to the user. As the component identification and token generation has been previously described, this section now describes the token expansion, query structure generation, and query evaluation operations.

Token Expansion

Figure 10:
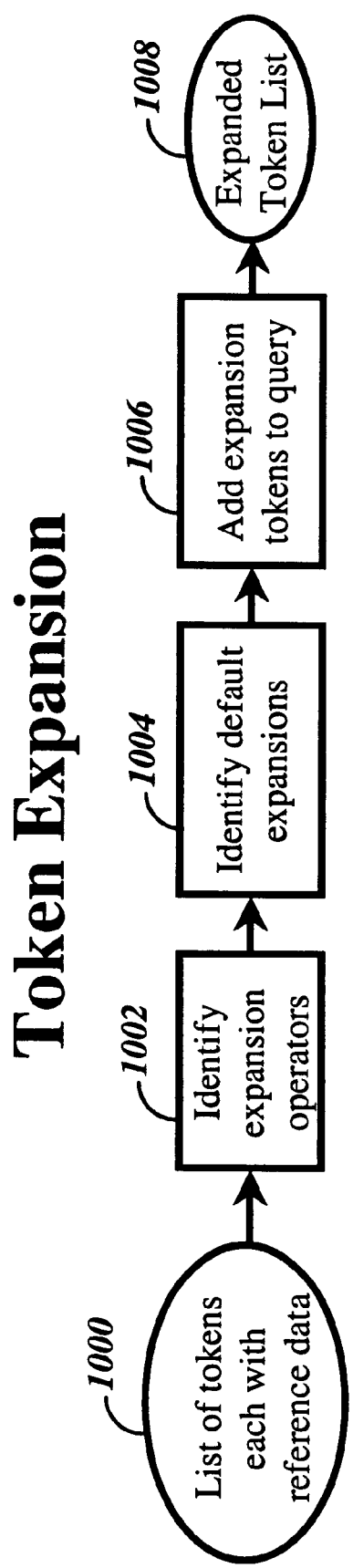
FIG. 10 is a flowgraph of the general process of token expansion.
Figure 11A:
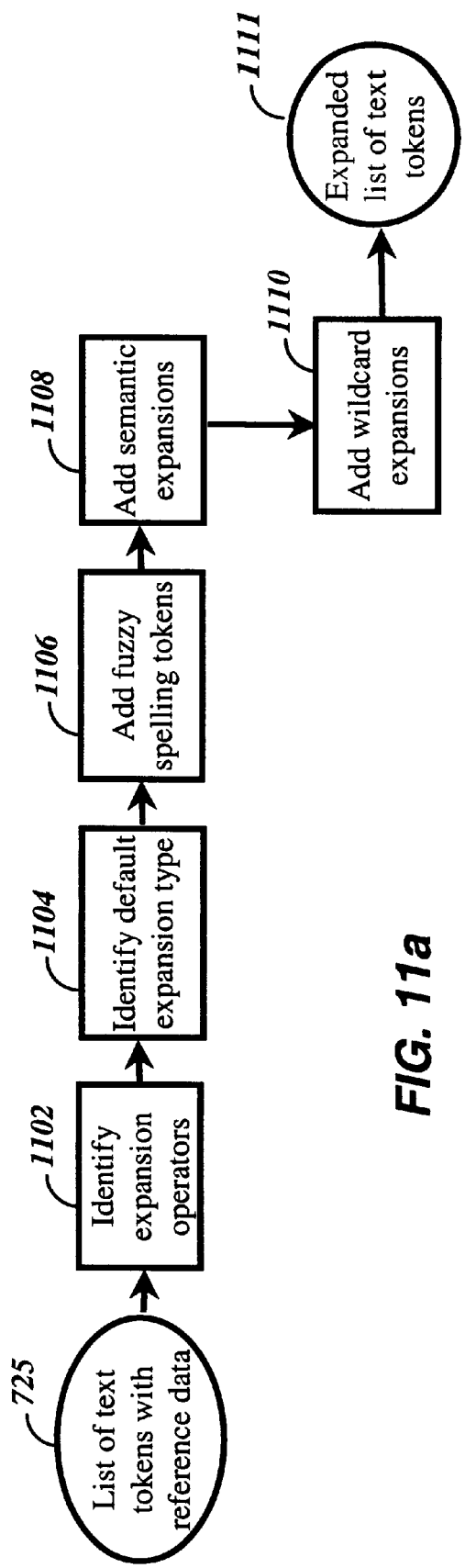
FIGS. 11a–c are flowgraphs of the operations for text, image, and audio token expansion.
Figure 11B:
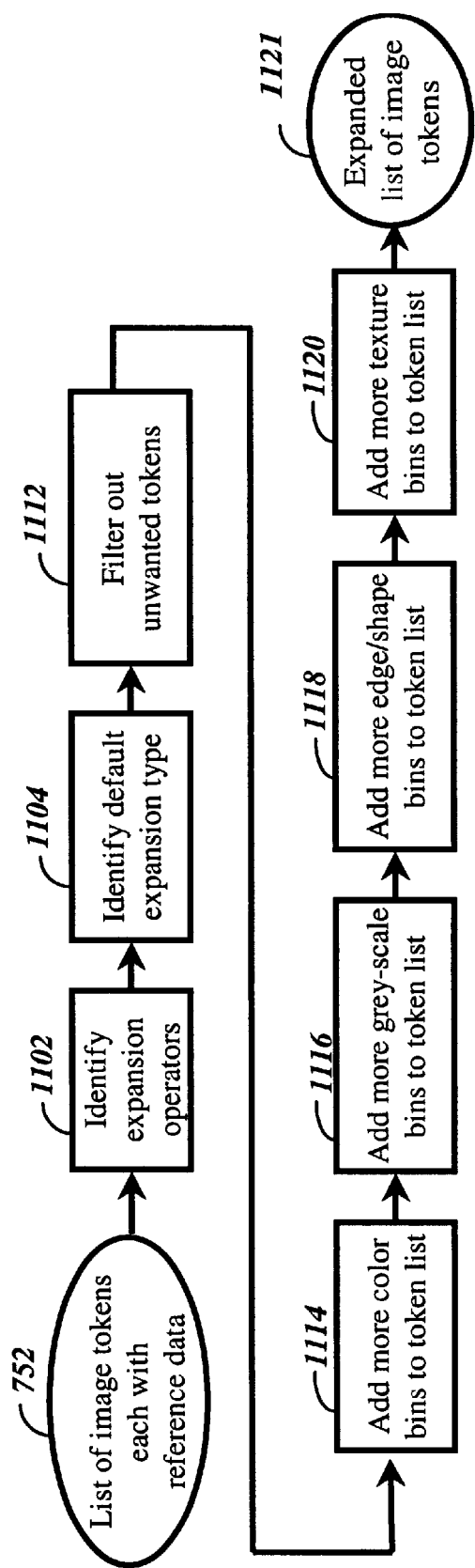
Figure 11C:
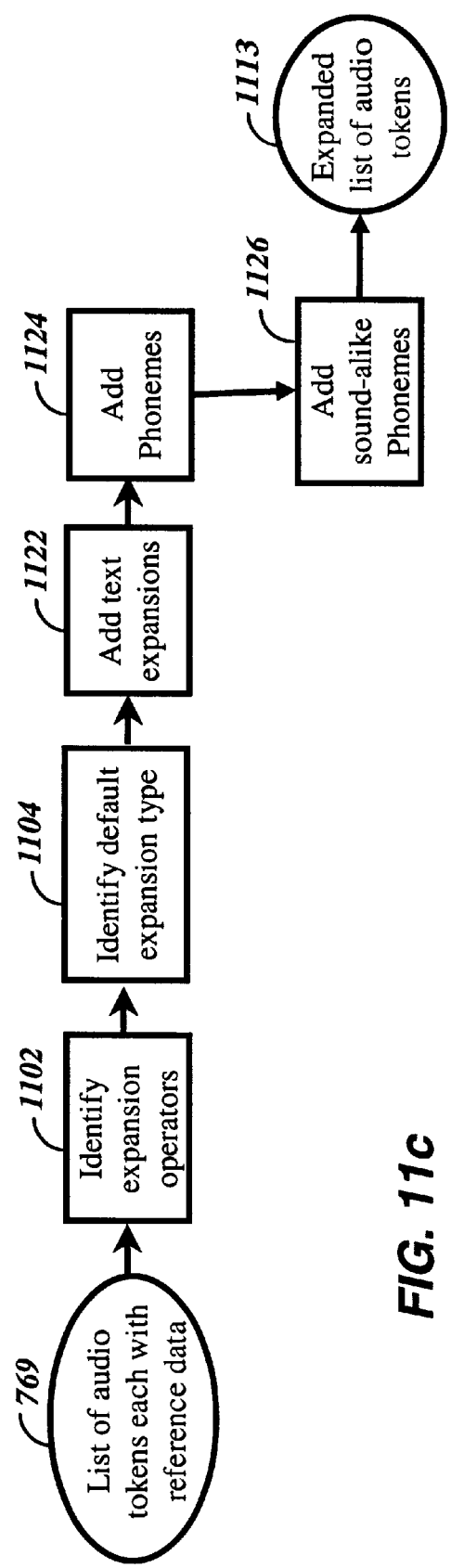

As an optional feature, the addition of various types of tokens to the query is provided by a query expansion processing module. Token expansion provides a type of "fuzzy search" capability which locates documents having similar content to the original query. Referring to FIG. 10 there is shown a general flowgraph of the token expansion process. FIGS. 11a–11c illustrates specific examples of token expansion for each different type of multimedia component.

Generally, the input to the token expansion processes is a list 1000 of query tokens generated from pre-processing of the user's input query.

First, a set of expansion operators is identified 1002. Typically, users prefer to control their token expansions, either with preferences or operators. Accordingly, the user interface for query input preferably accepts special expansion operators, which are dependent on the type of multimedia component being queried, and will tag the token list 1000 with the type of expansion desired. Also, the user may select to use expansion operators with some token types but not others (e.g. images but not text).

For those tokens which are not expanded using expansion operators, a default expansion style 1004 can be set. The default expansion style is based on the user settings.

After the expansion style for each token is determined, the remaining modules actually add 1006 the expansion tokens to the query. There is one module for each type of expansion. The result is an expanded token list 1008 for the type of token.

Text Token Expansion

Referring to FIG. 11a, there is shown an embodiment of text token expansion 180a, including three types of text expansions: fuzzy spelling 1106 (find similarly spelled words to a query word), semantic expansions 1108 (find words which mean the same thing as the query word), and wildcard expansions 1110 (find words which match user specified character patterns).

The first two operations are to identify 1102 which expansion method will be used, and apply 1104 default expansion type. The first step looks for expansion operators, whether directly embedded in the query by the user, or selected via a graphical user interface. For example, in one embodiment the exclamation mark (!) is used to invoke semantic/thesaurus expansion, and the tilde (~) is used to invoke fuzzy spelling expansion. In one embodiment, the user inserts these expansion operators directly into the input query; in a more sophisticated implementation, user interface gadgets are provided to allow for point & click selection of the different types of expansion on various token types.

For those words not otherwise marked with expansion operators, a default expansion type is set 1104. This can be none, semantic, fuzzy spelling, or other, as desired by the system developer.

After the type of expansion is determined for each word, the additional tokens are actually added to the query.

Fuzzy spelling expansions 1106 are added by scanning through all of the unique word tokens in the index. Word tokens which are similarly spelled (have the largest number of similar sub-word character patterns) are added to the query. The user may choose a number (i.e. top 10 similarly spelled words), or a threshold (words which may have up to a maximum number of character differences) to determine exactly how many additional tokens are added to the query. Alternatively, each token may be linked to a list of other word tokens which have similar spelling, or which are common misspellings. These tokens can also be added to the query.

For each word in the query that is indicated for semantic expansion, the word is looked up 1108 in a semantic network or thesaurus. The semantic network or thesaurus links together words that have similar meaning, and may employ various types of links and weights on links. Once the word is located, other words with similar meaning (these are identified by the semantic network resource) are added to the query as the additional tokens for semantic expansion. Filtering may be done to select linked tokens that have sufficient weight or types.

Finally, for words which have user-specified patterns, such as UNIX™-style regular expressions, the list 902 of tokens in the multimedia index 140 is scanned and checked against the pattern. If a token matches the pattern, it is added 1110 to the query token, up to a user-configurable maximum number.

These three token expansion methods are illustrative, and there can be any number of additional expansion styles used in accordance with the present invention.

Finally, for the first two of these expansion types a measure of similarity (from 100% for exact matches, to 0% for nothing in common) is added to the reference data of each expansion token. This additional reference data is used during relevancy scoring to refine the identification of compound documents that satisfy the query. Documents with tokens having higher similarity measures will be more relevant to the query.

Image Token Expansion

Referring to FIG. 11b, there is shown one embodiment of image token expansion 180b. This method applies only where image pre-processing generated multiple image tokens to begin with, since if only a single image token is created, it is preferable to use only that token without further expansion of it.

As before, the initial steps of identifying 1102 the specified expansion operators, and applying 1104 default expansion operators are performed. Tokens were originally added to the query by computing histograms for color, gray-scale, shape, and texture for the user input query 150. During that stage, tokens were specified as the strongest histogram bins for each of these attributes.

As noted above with respect to FIG. 3, the query retrieval process allows the user to specify particular component-specific operators. With respect to images, these include color, shape, texture, and brightness. For example, the user could specify a query such as <IMAGE>/shape, to say that they are interested in other images of similar shape, regardless of color or gray-scale content of other images. Accordingly, before tokens are expanded, the tokens for image attributes not corresponding to the specified image-specific operators are removed 1112 from the query token set. This leaves only those tokens representing the image attributes that the user is interested in retrieving.

Then, for each remaining type of image token, additional image tokens are easily added 1114–1120 by simply adding adjacent bins as tokens to the query, from the corresponding image histogram. For example, if the original query image had a large amount of red in the color histogram there would be a $red$ token representing the red colors in the histogram; then additional tokens to be added 1114 could include $red_orange$ and its color values as reference data (i.e. red with an orange tinge) and $red_purple$ and its color values as reference data (red with a purple tinge). Alternatively, the additional tokens may come from the bins that have the next highest bin counts below the previous thresholds. For example, if initial color histogram threshold was to select the 10 highest scoring color bins, then expansion of the color tokens may add the next 5 highest scoring color bins.

Similar expansion can be applied to adding gray-scale 1116, shape 1118, and texture 1120 tokens to the query.

Each expansion token will have a similarity measure stored in its reference data, to indicate how similar it is to the original image token specified in the query by the user. For example, if the input query resulted in a $red$ token, then the $red_orange$ token may have a similarity measure of 80%, and $red_purple$ may be 70%.

Audio Token Expansion

Referring to FIG. 11c, there is shown one embodiment of audio token expansion 180c. As before, the initial operations of identifying 1102 expansion operators and default expansion type 1104 are applied.

Since audio data is reduced to text tokens during pre-processing 170d, all of the standard text expansions are also applied 1112 to these text tokens.

Second, where the speech recognition system additionally or alternatively indexes phonemes, the tokens in the query are looked up in a pronunciation dictionary. The pronunciation dictionary specifies the phonemes which make up each token. These phonemes are added 1124 to the query as additional tokens.

Additional phoneme expansions may be added 1126 to the query which sound similar to the original phonemes. For example, where the query token is "Ba", the phoneme tokens for "Da", "Ta", "Ka", and "Ga", may be added. Optionally, word tokens for words with phonemes similar to the query phonemes may be added (not shown).

The result of this expansion process is the expanded list 1113 of audio query tokens.

All phoneme tokens added to the query will have a similarity measure added to their reference data. The similarity measure ranges from 1.0 to indicate that the phoneme sounds exactly like the word specified by the user, to 0.0 to indicate that the phoneme sounds nothing like the original phonemes in the query. As before, these similarity measures are used in relevancy scoring to select the best compound documents.

Create Query Structures

Figure 12:
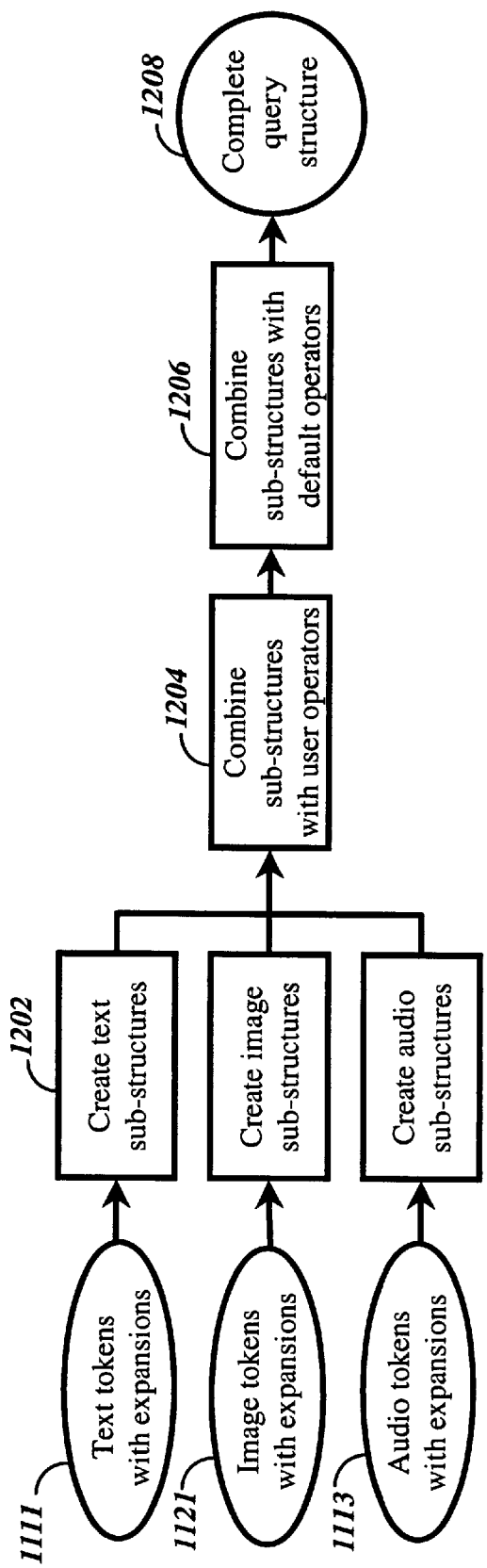
FIG. 12 is a flowgraph of the general process of creating query structures.

Referring now to FIG. 12 there is shown a flowgraph of one embodiment of the process 190 of creating query structures for execution during retrieval. The purpose of this process is to convert lists of the various tokens into a single query structure, where tokens are combined together with query operators. This process is effected by a query structuring module.

First, tokens are combined 1202 into sub-structures with specific combination processes for each type of multimedia component. Next, these substructures are further combined 1204 with user-specified operators. Finally, if no user-specified operators are present in the query, then the tokens are combined 1206 with default operators to create the complete query structure 1208.

In one embodiment, the following operators are used. These operators are split into two groups: mathematical operators and proximity operators.

The mathematical operators are as follows:

NOT(x)=If x>0 return 0, otherwise 1.0
MIN(x,y)=If x>y return y, otherwise return x
MAX(x,y)=If x>y return x, otherwise return y
AVERAGE(x,y)=(x+y)/2
AND(x,y)=If x>0 and y>0 then the result is AVERAGE (x,y), otherwise 0
PR_COMB(x,y)=(1−(1−x)*(1−y))
OR(x,y)=PR_COMB(x,y)
GMEAN(x,y)=If x>0 and y>0 then result is sqrt(x*y), otherwise 0
WEIGHT(x,k)=k*x (where k is a constant)

Note that all operators may take more than two arguments (with the exception of the NOT operator).

The proximity operators are as follows:

ADJACENT(x,y,n)=AND(x,y) only for occurrences of x & y in a document where y follows x and is separated by no more than 'n−1' number of intervening words.
PHRASE(x,y)=ADJACENT(x,y,1)
WITHIN(x,y,n)=AND(x,y) only for occurrences of x & y in a document where x and y are separated by no more than 'n−1' intervening words.
NEAR(x,y)=WITHIN(x,y,5)

Note that each proximity operator is paired with a mathematical operator. The mathematical operator is used for the operator during coarse-grain relevancy scoring, and the proximity operator is used during fine-grain relevancy scoring. For example, WITHIN(x,y,5) will be scored as AND(x,y) during coarse-grain scoring, and then the WITHIN(x,y,5) is applied during fine-grain relevancy scoring. Typically, these operators are only applied to the query structure if specifically entered by the user as part of the query. Also note that all proximity operators can be defined to take more than two arguments. Additional proximity operators can, of course, be defined, such as WITHIN_PARAGRAPH, WITHIN_SENTENCE, and so forth.

The "x" and "y" operands are weighted numeric values (weight*token value) where the weight is the similarity measure, and the token value depends on whether the query structure is being evaluated during coarse or fine-grain searching. The similarity measure, as noted above, is determined during token expansion. Each token expansion process is responsible for outputting its own similarity measures for added tokens. In a preferred embodiment, tokens that are directly input by the user as part of the query have a similarity measure of 0.5; tokens added during token expansion have similarity measures less or equal to 0.5. This gives the PR_COMB function a range of output values that allows the presence of expansion tokens to enhance the document's relevancy score.

During coarse-grain searching, the token value is either 1 or 0 depending on whether the query token is present or absent in the document being scored. During fine-grain searching, the token value is derived from the reference data. More specifically, for text tokens, the token value is always either 1 or 0. For word and phoneme tokens from documents which were originated from audio data, the token value will be the confidence factor produced by the speech recognition system for the words or phonemes and indexed alternates. For images, the token value will be based on a comparison of the reference data stored with the token from the query with the reference data stored with the token as it is in the document (i.e. comparing the image histograms for the image specified in the query against the image histograms for the image as stored in the indexes).

For example, assume the user inputs a simple text query: "chair".

During token expansion, this token is expanded only to include one more token:

"chair"→("sofa", 0.4)

where 0.4 is the similarity measure of "sofa" to "chair". The token "chair" has a similarity measure of 0.5 since it is in the query. (See discussion above on 0.5 weights.)

The query structure is then:

OR(0.05*chair_token_value, 0.4*sofa_token_value)

where chair_token_value and sofa_token_value will be determined for each document being processed, depending on whether the processing is during coarse or fine-grain searching.

Creating Text Query Substructures

Figure 13A:
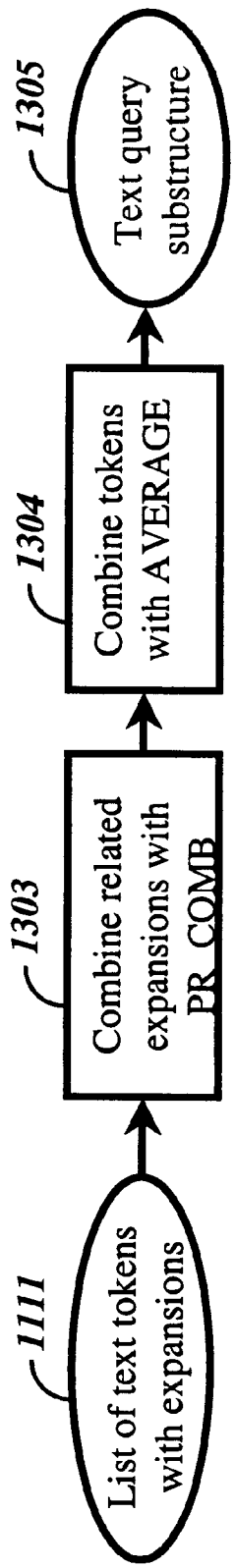
FIGS. 13a–d are flowgraphs of the operations for creating text, image, and audio substructures for a query.

Referring to FIG. 13, there is shown one method of creating text query substructures. The input is a set of tokens, which preferably includes the token expansions. The output is a text query substructure 1305.

First, each token is combined 1303 with all of its expansions using PR_COMB to form a PR_COMB expression. Each PR_COMB expression uses the similarity measures as the weights; the token values are represented by variable placeholders.

Second, each PR_COMB expression is combined 1304 with AVERAGE to form a single text expression.

For example:

| Query tokens | Expansions (token, similarity measure) |
| --- | --- |
| foreign | (international, 0.4), (external, 0.3) |
| trade | (business, 0.4), (market, 0.45) |

Then, the text substructure is:

AVERAGE(PR_COMB(0.5*foreign,0.4*international, 0.3*external),
PR_COMB(0.5*trade, 0.4*business, 0.45*market))

where the italicized token names represent the token values. In this and the following examples, the token expansions and similarity measures are exemplary only.

It should be noted that this is merely one way to create a text substructure. Different operators and combinations of operators may also be used.

Creating Image Query Substructures

Figure 13B:
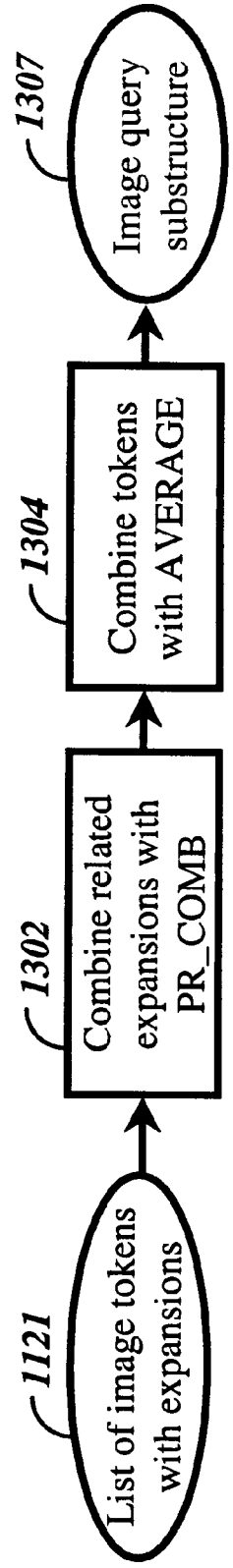

Referring to FIG. 13*b*, there is shown one method of creating image query substructures. The input is the set 1111 of image tokens, including any expanded tokens. The output is an image query substructure 1307.

As before, the expansion tokens have similarity measures in their reference data. First, each token is combined 1302 with all of its expansions to form a PR_COMB expression. Each PR_COMB expression uses the similarity measures as the weights; the token values are represented by variable placeholders. Second, each PR_COMB expression is combined 1304 with AVERAGE.

Expansions have weights associated with them, stored in the reference data. These weights will be used when computing the function.

For example:

| Query tokens | Expansions (token, similarity measure) |
|---|---|
| $red$ | ($red-orange$, 0.9) |
| $90-degree-angles$ | ($80-degree-angles$, 0.88) |
| $dense-texture$ | ($near-dense, 0.7) |

The image query substructure is:
AVERAGE(PR_COMB(1.0*$red$,0.9*$red-orange$), PR_COMB(1.0*$90-degree-angles$, 0.88*$80-degree-angles$), PR_COMB(1.0*$dense-texture$, 0.7*$near-dense$)).

Note that only one token of each type (color, shape, texture) is shown in this example. However, in practice there may be multiples of each type. For example, if an image is strong in both red and green, then it will have both $red$ and $green$ tokens, each with their respective strengths.

Creating Audio Query Substructures

Figures 13C, 13D:
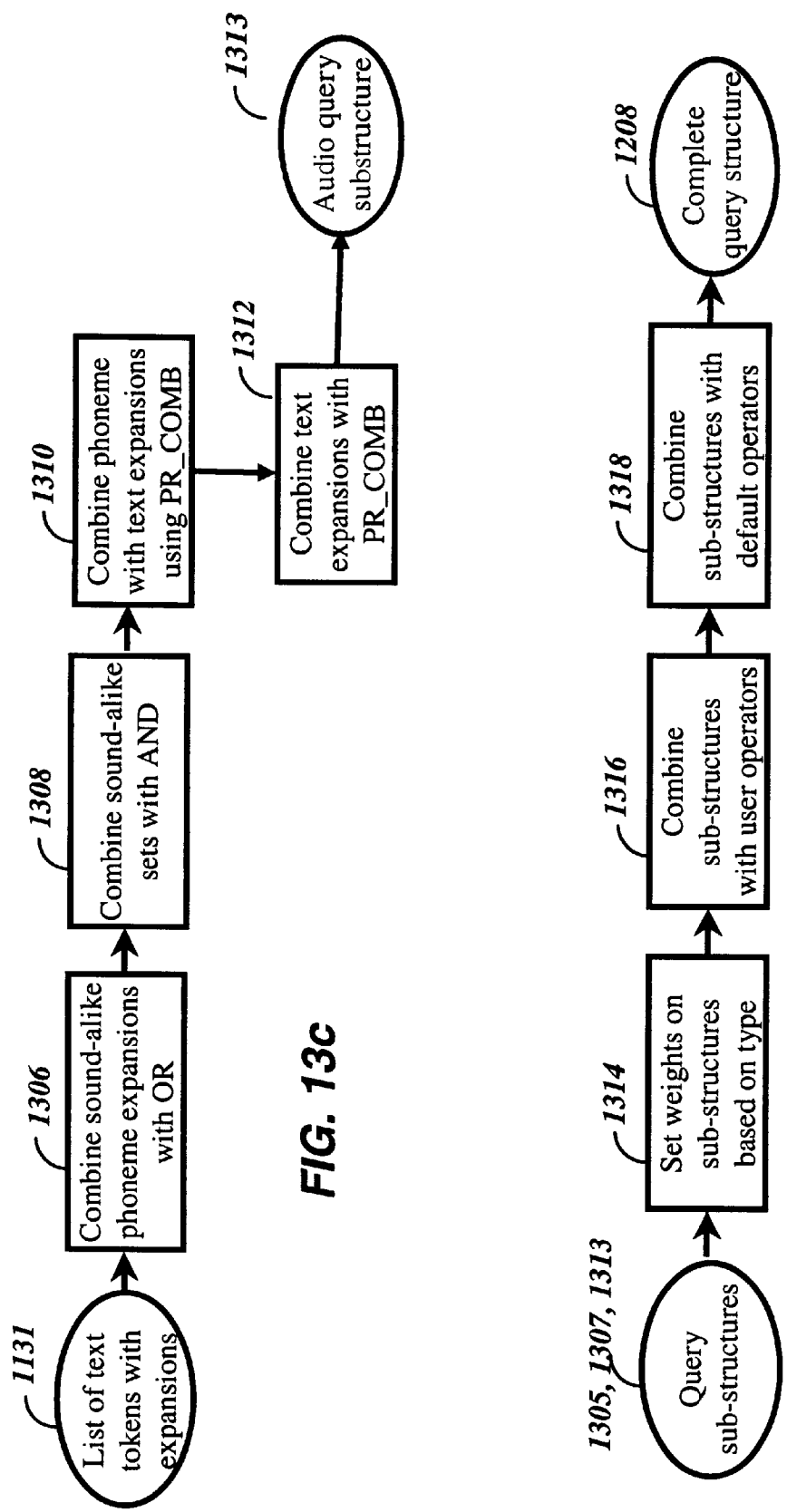

FIG. 13c illustrates how tokens from audio expansions are converted into query structures. The input is a set of tokens from the audio processing. The output is an audio query substructure 1313.

Each token may have been expanded using text expansions into related words (similar meaning or similar spelling). Further, each token may have been already expanded into phoneme components, and these phoneme components may have been expanded even further with sound-alike phonemes.

First, sets of sound-alike phonemes are combined 1306 together into OR expressions. Second, these OR expressions are combined 1308 together into an AND expression. Third, the entire phoneme expression is combined 1310 with all other text expansions using PR_COMB. Finally, the text expansions are combined 1312 with PR_COMB.

For example:

Example token: "Daddy"

Text Expansions: ("Father", 0.45), ("dad", 0.45), ("papa", 0.45), ("patriarch", 0.45)

Phoneme expansions: "Da"→[("Ba",0.4), ("Ka",0.35), ("Ta",0.45)]
"dee"→[("Bee",0.4) ("Kee",0.35) ("Tee",0.45)]

The query substructure here is:
PR_COMB(daddy, father, dad, papa, patriarch, AND(OR(Da, Ba, Ka, Ta), OR(Bee, Kee, Tee))).

(Weight multipliers are left out for readability.)

Combining Query Substructures

Referring to FIG. 13d there is shown a flowgraph of the process of combining query substructures together to make a single query structure.

First, each query sub-structure is weighted 1314 based simply on the type of structure. For example, all text components get a weight of 3 and image components a weight of 1. The actual values of these weights are determined through a statistical regression analysis (i.e. evaluate 1000 results from 50 queries and compute average weights for the best results). Other mechanisms may also be used to determine the appropriate weights. These weights, when used with the AVERAGE function, produce a simple weighted average.

If the user provides specific query operators to combine the sub-structures together (e.g. "red AND ball AND <image>"), then these operators are used to produce 1316 the final query structure. Otherwise, default operators (determined by user settings) will be used 1318. Typically, this will be AVERAGE, but other operators may be used.

For example, the query:
"red ball <image_of_red_ball>"

(Note here that there are no user-specified operators in the query.) Using various token expansions the result is (similarity measures are not shown for simplicity):
AVERAGE(3*AVERAGE(PR_COMB(red, ruby, scarlet), PR_COMB(ball, toy, basketball, baseball)), 1*AVERAGE(PR_COMB($red$,$red-orange$, $red-purple$), PR_COMB($gradual-curves$, $near-gradual-curves$), PR_COMB($dense-texture$, $near-dense-texture$))).

Those of skill in the art will appreciate that the present invention allows this type of unified query structure in which tokens for different types of multimedia components can be freely combined with the any of the set of query operators. This feature arises from the unified multimedia index 140 in which the different types of multimedia components are all commonly indexed. The combined query structure then allows direct relevancy scoring of any compound document containing different types of multimedia components, since the entire query structure can be evaluated with respect to a given document. In contrast, other multimedia retrieval systems do not provide a consolidated evaluation of a query for different multimedia data types against an arbitrary document, but rather, typically require the different types of multimedia components to be separately scored and evaluated, with separate queries, the results of which are combined.

Search Multimedia Index

Figure 14:
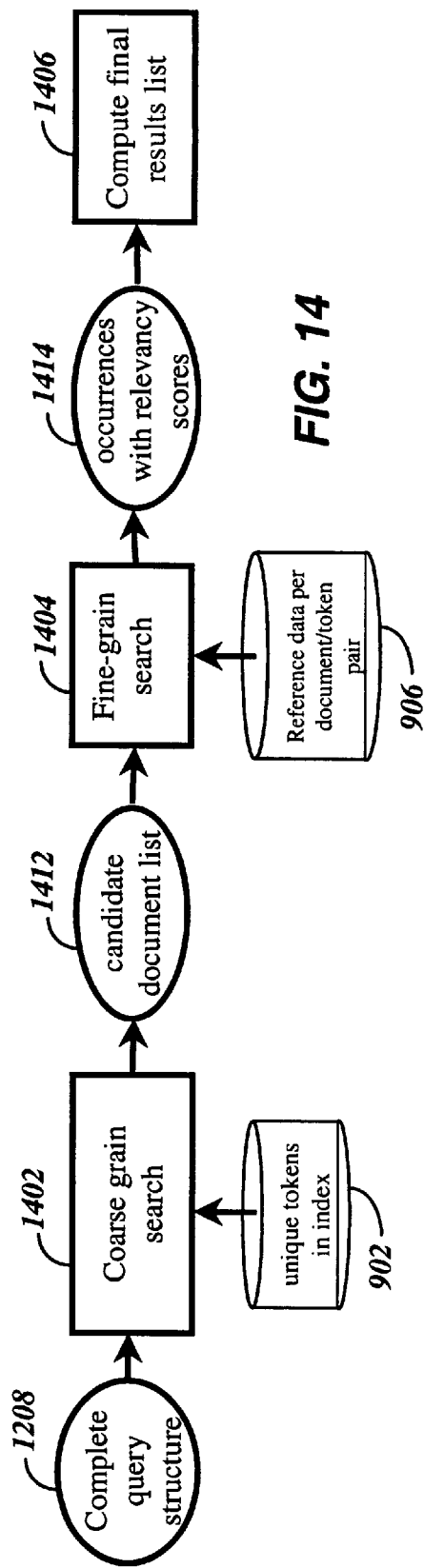
FIG. 14 is a flowgraph of the general process of searching the multimedia index using the query structure.

Referring to FIG. 14, there is shown a flowgraph of the overall process of searching 200 the multimedia index 140. The searching process is effected by a query execution module.

Searching is broken into three major stages: Coarse-grain searching 1402, fine-grain searching 1402, and final scoring 1406. This division is done primarily for performance reasons. While it is certainly possible to do fine-grain relevancy ranking on all documents in a database, such a method would be very slow.

Coarse-grain searching 1402 is an initial relevancy ranking stage used to identify a "rich subset" of documents that likely satisfy the user's query. Coarse-grain searching 1402 generally considers the existence or absence of tokens in a document when computing the value of the query structure for a document. Thus, as noted above, a query token receives a token value of 1.0 if it is present in the document, and a token value of 0.0 if it is absent. The only data required for this computation is the list of documents 904 which contain each token. For each document, the query structure is computed. This gives the coarse-grain score for each document. The result is a candidate document list 1412.

Fine-grain searching 1404 provides more detailed scores of individual token occurrences in the candidate documents. More particularly, fine-grain searching 1406 scores each occurrence of each query token in a candidate document. These occurrences would correspond to "highlights" seen when browsing documents from typical search result sets. Fine-grain searching 1404 compares the reference data of an occurrence as stored in the multimedia index 140 to the reference data of the token in the query to compute a score for each token occurrence. The result is a set 1414 of token occurrences with relevancy scores. The computation of the occurrence score is based on the type of multimedia token being compared. Image tokens will have a different function than text tokens, and so forth.

For example, if the query contains a single image token (per FIG. 7b), this image token will have been pre-processed and the query token will contain the histograms for color, shape, texture, and luminance of the query image in the reference data. Meanwhile, these histograms have already been pre-computed and stored in the multimedia index 140. When computing the score for each occurrence of query tokens in the document, the histograms from the query image are compared with the histograms from the document image and the resulting score (where 1.0 represents the exact same image, and 0.0 represents a completely different image) is stored with each occurrence of the token and can be used to identify "hot spots" within each document (e.g. the best matching images in a document).

Fine-grain searching 1404 is also used to compute proximity scores, where the proximity of tokens to each other in the document affects the final score of the document. This is done by scanning a window across the document, and applying the query structure to all of the token occurrences (appearance of a query token) which occur in the window. This adjusts each occurrence score based on other occurrences which are nearby.

Final scoring 1406 summarizes these occurrence scores over the entire document in a variety of ways (count of occurrences, average occurrence score, maximum occurrence score, and the like). These summarized scores are combined with other document data (e.g. the total number of tokens in the document) and the coarse-grain rank to determine the final document score. The final scores are sorted, the best scoring documents selected, and the search results presented.

Coarse-grain Search

Figure 15A:
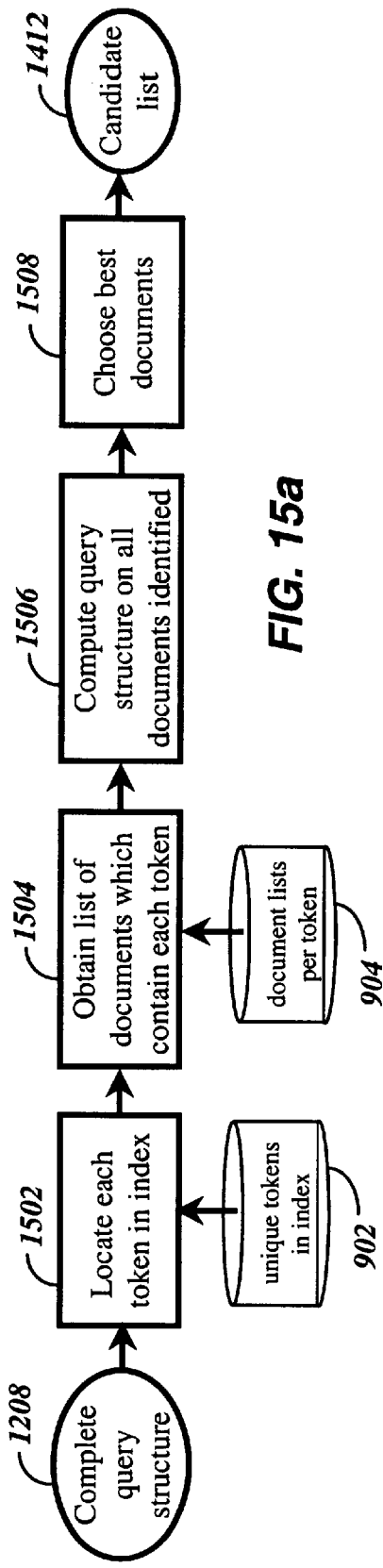
FIG. 15a is a flowgraph of the operation of coarse-grain searching.

Referring to FIG. 15a, there is shown a flowgraph of one embodiment of coarse-grain searching 1402. First, each token from the query is located 1502 in the token list 902 of the multimedia index 140. Next, the list 904 of documents which contain the token is read from the multimedia index 140. This can be a simple list of document IDs. These first two steps are repeated for every token in the query structure.

Now, the query structure is resolved 1506 for each unique document ID read from the index 140 (scoring by unique ID avoids twice scoring documents; alternatively, the document ID list can be stored and duplicates eliminated). To compute the query structure, the value of each query token which exists in the document is set to 1, and then multiplied by the similarity measure for the token which was computed during token expansion and stored in the reference data of the query token. Values for query tokens which do not occur in the document are set to zero. Also, all proximity operators in the query structure are converted to their corresponding mathematical operators, since the proximity information in the reference data is not used at this stage.

Now, the query is computed using the formulas identified in the query structure. The result of computing the query structure is the coarse-grain relevancy score. Note that this is merely one technique for computing the coarse-grain rank. Computationally more efficient techniques are (of course) possible.

Once the computations are finished, a set 1412 of the best documents are selected 1508 as the candidate documents to fine-grain searching 1404. The number of candidate documents selected can be specified by the user as either an absolute number, or as a threshold based on the coarse-grain relevancy ranking score, or other filtering means.

Fine-grain Search

Figures 15B, 15C:
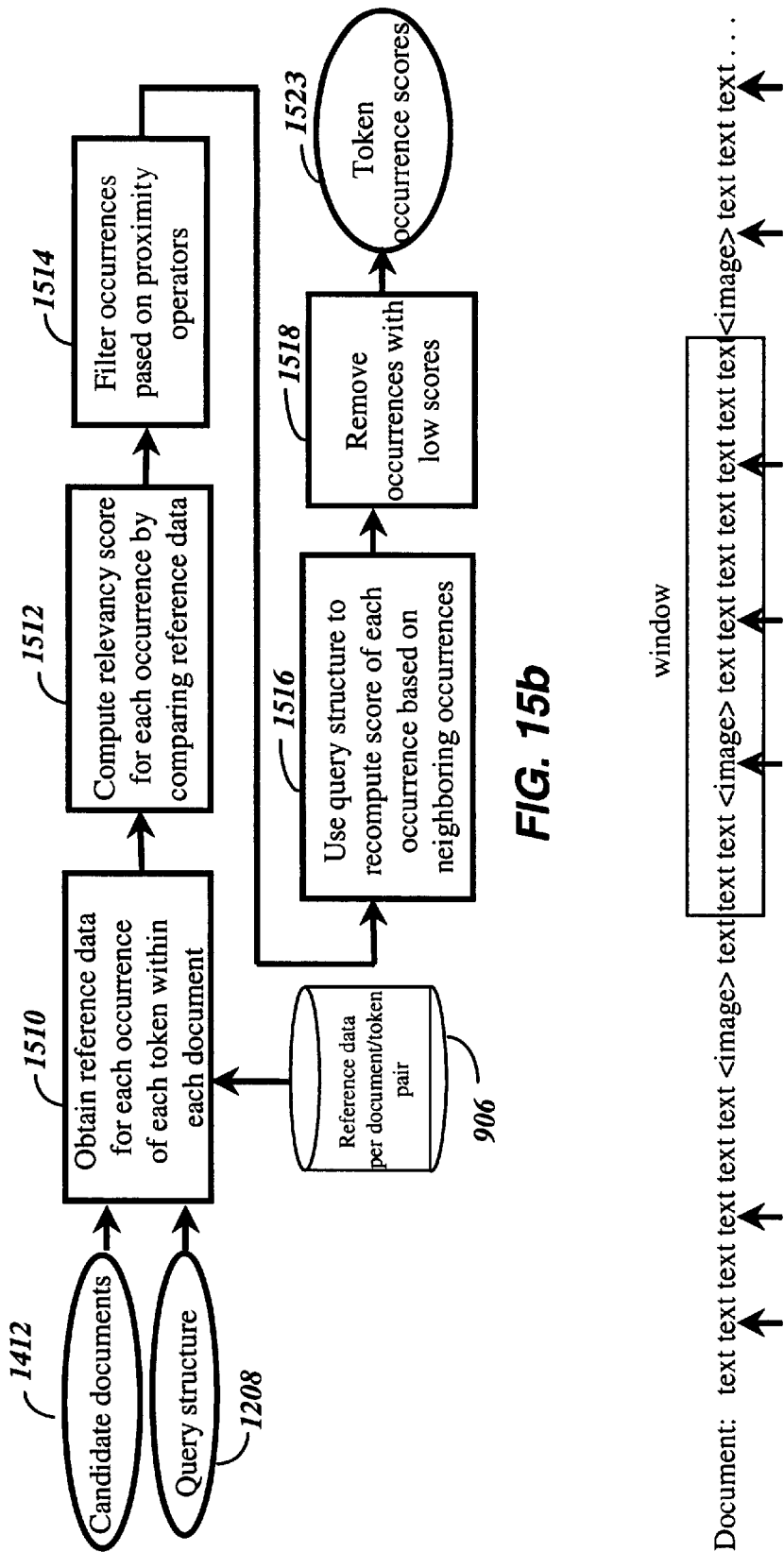
FIG. 15b is a flowgraph of the operation of fine-grain searching.
FIG. 15c is a graphical representation of the operation of applying a window to score occurrences based on the presence neighboring occurrences.

Referring to FIG. 15b, there is shown one embodiment of the fine-grain searching 1404 process. The input to this stage is the candidate list 1412 of documents produced by coarse-grain searching 1402 and the query structure 1208. The output is a set 1523 of token occurrence scores for each candidate document. This process is repeated for each candidate document, until all candidate documents are processed.

First, the reference data for each occurrence of each query token in the candidate document is read 1510 from the reference data list 906 for the candidate document in the multimedia index 140.

Second, each occurrence of a query token is scored 1512 by comparing its reference data to the reference data from the token as retrieved from the multimedia index 140. The result of this comparison is the "token value" discussed previously, and can be any value from 0.0 to 1.0. The comparison function is dependent on the type of data for the token:

For text tokens for words: The comparison function is the same as for coarse rank, i.e. all occurrences for the token in the document are set to 1.0, and in this case there is no specific comparison of reference data.

For image tokens: compare the histogram (e.g. color, texture, gray-scale, edge) from the image token in the query against the corresponding histogram from image token in the document stored in the reference data. The comparison can be a statistical comparison of the two histograms, which returns 1.0 if the histograms are exactly the same, and 0.0 if the histograms have no more in common than they would with a randomly generated histogram. The result of this comparison will be stored as the score for the occurrence of the image token in the query.

For number and date tokens: If the actual value of the number is within the range specified by the user, then the score is set to 1, otherwise it is zero.

For audio/phoneme tokens: Tokens which were derived from audio data by applying a speech recognition system are stored as text tokens in the index. However, these tokens have additional reference data which indicate the confidence factor produced by the speech recognition system (i.e. the confidence of the speech recognition system that the produced text token is the actual text token). The score for each such occurrence of these words is set to the confidence factor originally produced by the speech recognition system when the token was first stored in the indexes.

The next step in computing fine-grain scores is to apply 1514 any proximity operators to the list of occurrences retrieved from the document. These operators include the PHRASE, ADJACENT, WITHIN, and NEAR operators defined earlier. These operators were computed as AND during coarse-grain relevancy scoring, since proximity data (i.e. the list of occurrences of each query token in a document) was not used at that stage. Since the reference data of tokens contains the position of the token within the document, tokens with these restrictions are checked against the specified operator. If the occurrence falls outside the specified proximity (i.e., away from neighboring tokens as specified in the query structure with the proximity operators), the occurrence score is set to zero. Otherwise the occurrence score is left alone. In this sense the proximity operators act as Boolean operators, meaning that either the occurrences fall within the boundaries specified by the proximity operator (and hence the occurrence is left unchanged), or they are outside the boundary (and so the occurrence score is set to zero).

The previous step computed a Boolean style of proximity operator which would set occurrences to 0.0 if they failed certain boundary checks. This next step implements a statistical style of proximity test which adjusts each occurrence score based on other occurrences from other query tokens which occur nearby.

This is done 1516 by passing a "window" over the document. FIG. 15c illustrates this process. The size of the window is expressed in number of adjacent tokens, and is usually based on the number of tokens entered by the user in the query. In the preferred embodiment, the window size is set to simply 4 times the number of tokens entered by the user in the query. For example, if the user enters a four item query, then the window would be 16 words wide. Other functions may, of course, be employed, such as giving additional weight to image tokens (e.g. each image would count for 4 words when computing the window size).

In the preferred embodiment, the window is centered on each occurrence of a query token in the document. All neighboring occurrences (from any query token which occurs in the document) that are close enough to fall within the boundaries specified by the window are considered when computing the occurrence score for the current token. Other occurrences which are not sufficiently close enough to the center occurrence are ignored.

Figure 16:
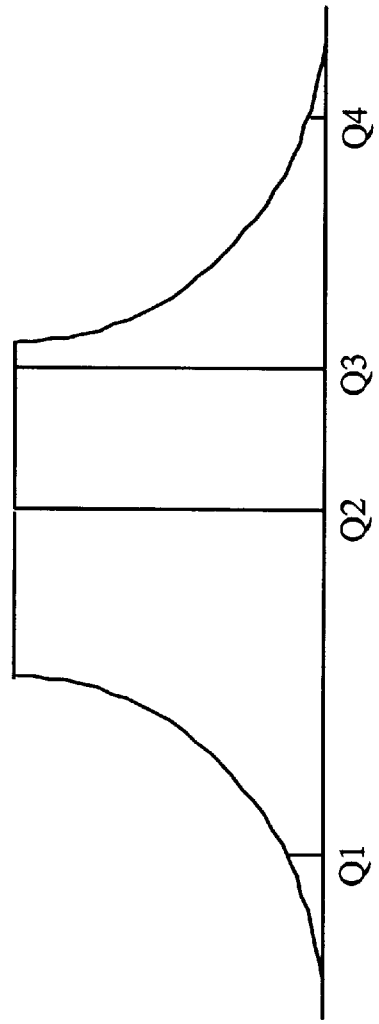
FIG. 16 is an illustration of a derating function for adjusting token occurrence scores based on distance to another token occurrence.

Next, the occurrence score each of the other token occurrences in the window is reduced ("derated") based on how far away it is from the center token occurrence. To accomplish this reduction, the distance of each token occurrence from the center token occurrence is computed, and this distance is input to a derating function, the results of which are multiplied by the computed score for the occurrence. One derating function is show in FIG. 16. In this figure, Q2 represents the occurrence which occurs at the center of the window. Occurrences within a predetermined distance/percent of window size (cutoff) are not reduced; occurrences further away are exponentially decayed (or linearly if desired) as a function of their distance from the cutoff. For example, occurrences Q1 and Q4 reduced to a fraction of their original scores while Q3 maintains its original score.

The resulting occurrences are then input to the query structure. The preferred embodiment uses the same query structure for coarse-grain rank as is now applied for occurrences of tokens within the window, (although other implementations may, of course, use different query structures for fine-grain and coarse-grain scoring). Query tokens which occur only outside the window have a token value set to 0.0 when computing the query structure. For other tokens, the resulting token value is the score of the token's occurrence, as computed by comparing reference data (described in previously) and derated by proximity to the center of the window. If a query token has multiple occurrences which occur within the window, only the occurrence with the maximum score (after derating) is considered.

The result of computing the query structure for the window centered on an occurrence is saved. After query scores are computed for all window iterations through the document, the score of each occurrence is replaced with the score based on the window which was centered on that occurrence.

Finally, all token occurrences are scanned, and those which are equal to or below a specified threshold are removed 1518 from the list of occurrences for the document. This threshold could simply be zero, which would remove dates and numbers outside the range specified in the query, and would remove occurrences which fall outside the restrictions imposed by the proximity operators. Or, this threshold could be a small score (such as 0.1), which, for example, would remove images from the occurrences which only weakly match the associated image from the query, or which could remove weak is occurrences which are not strengthened by neighboring occurrences.

Final Score Computation

Figure 15D:
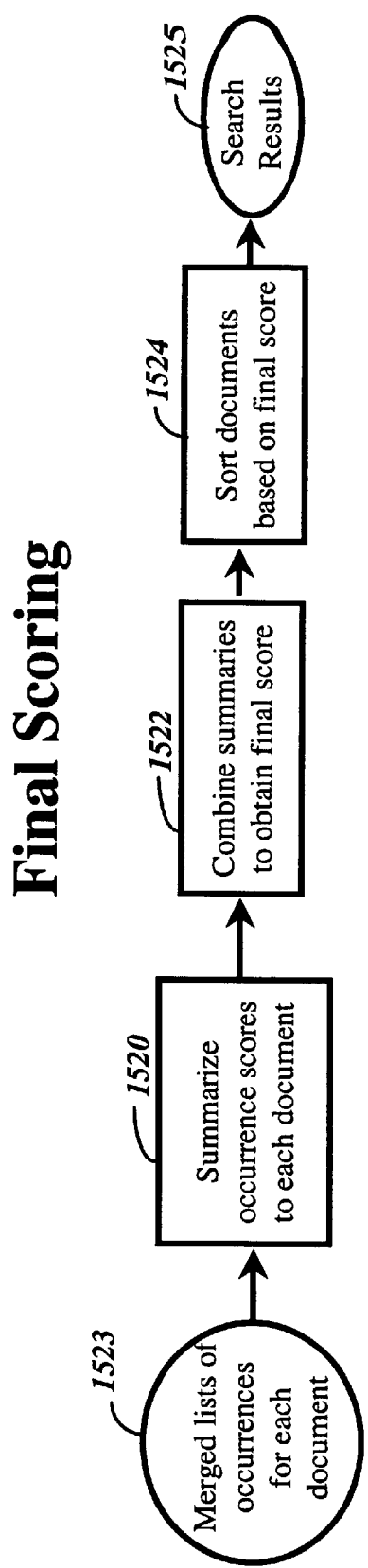
FIG. 15d is a flowgraph of the operation of final scoring and sorting.

FIG. 15d illustrates the final scoring process. For each candidate document, the input to this stage is the set 1523 of occurrence scores for all query tokens which occur in the candidate document. The output of the process is the final relevancy scores 1525 for the selected candidate documents.

Once the token occurrence scores are computed 1516 based on fine-grain scoring, a number of summaries are generated 1520 over all remaining token occurrences in the document:

MAX_HIT—Returns the maximum score for any token occurrence in the document.

NUM_HITS—Returns a count of the number of token occurrences in the document.

NUM_WORDS—Returns a count of the total number of token occurrences in the document (regardless of if they occur in the query or not).

AVG_HITS—Returns the average score across all query token occurrences in the document.

COARSE_RANK—Returns the coarse-grain rank of the document.

These scores are combined 1520 in a linear equation to produce the final relevancy score for the document. The constants of the linear equation can be determined through a statistical regression analysis by executing, for example, 50 queries and evaluating the top 200 documents for each. One preferred embodiment uses a formula such as A*(NUM_HITS/NUM_WORDS)+B*MAX_HIT+C*COARSE_RANK, where A, B, and C are adjusted to balance the saliency of these different factors, based on analysis of the document set. This formula may also be adjusted for small documents, for example to have NUM_WORDS set to 100 for documents which have fewer than 100 words, or some other constant. Obviously, different scoring equations with different constants may be used.

These first two steps 1518 and 1520 of the process are repeated for each candidate document.

Once all candidate documents are scored, the final scores are sorted 1524, and the documents presented to the user, providing the best scoring documents first. A threshold may be used to select a limited number of the best scoring documents if desired.

In summary, the present invention provides a true multimedia retrieval system and method, that allows any multimedia document, having a variety of different types of multimedia components, to be both indexed and searched using a common set of query operators that operate on the various multimedia data types, and a multimedia index that commonly stores indexed data for these various multimedia components. With the present invention, all manner of different types of documents and multimedia components can be indexed and stored in a common database, and retrieved through a retrieval process and user interface. The present invention eliminates the need for different multimedia data types to be indexed and retrieved in different types of databases with different indexes and retrieval processes followed by an expensive and inaccurate merging of results lists. Rather, the present invention unifies both index structures used to represent multimedia documents, and the semantics and evaluation of the query operators that are used to selectively retrieve multimedia documents that satisfy a user's query. Further, the invention maintains multiple comparison functions, each tuned for its own multimedia data type, to provide the highest possible search accuracy.

We claim:

1. A computer implemented method for retrieving documents, including compound documents containing both text and at least one image, each image having a predetermined position within the document, the method comprising:

providing a multimedia index comprising a plurality of text tokens and image tokens, each text token associated with a text string, each image token associated an image feature, each token indexed to a list of documents including data associated with the token, and for each listed document indexed to an image token, reference data specifying at least a position of an image within the document from which the image token was identified; and processing a compound query, including at least one text token, at least one image token, and at least one search operator defining a logical or proximity relationship between the text and image tokens, with respect to the index to selectively retrieve compound documents that satisfy the compound query.

2. An article of manufacture comprising:

a computer readable medium; and a multimedia index stored on the computer readable medium and including:

a ordered set of tokens, including a plurality of distinct tokens for each of a plurality of different multimedia data types, including both text and image tokens, each token representing a distinct datum of one of the multimedia data types, and indexed to a set of documents containing at least one instance of the datum, each indexed document having reference data describing a position of the instance of data represented by the token within the document.

3. The article of manufacture of claim 2, wherein the multimedia index further comprises;

for each text token representing a distinct text string, the reference data associated with the text token contains the position of each occurrence of the text string in a document containing an instance of the text string; and for each image token representing a distinct image feature, the reference data associated with the image token contains image data extracted from an image in a document, and the position of the image in the document.

4. An article of manufacture, comprising:

a computer readable medium, storing thereon a plurality of modules executable by a processor, and including:

a multimedia component separation module that receives a document, and separates the document into an ordered set of multimedia components, including at least one text component and at least one image component;

a text pre-processing module that receives the at least one text multimedia component and produces at least one text token representing an instance of text data in the received text multimedia components;

an image pre-processing module that receives the image multimedia components and produces at least one image token representing an instance of image data in the received image multimedia components;

a multimedia index that receives from the text pre-processing module and image pre-processing module text and image tokens respectively, and indexes each received token to the document containing the instances of text or image data;

a query separation module that receives a compound query and separates the query into multimedia query components, each multimedia query component having a data type;

a query pre-processing module that produces a set of query tokens from the multimedia query components;

a query structuring module that structures the set of query tokens into an evaluatable query structure; and a query execution module that processes the query structure with respect to the multimedia index to selectively identify documents that satisfy the compound query.

5. An article of manufacture for indexing and retrieving compound documents comprising data from a plurality of different multimedia data types, comprising:

a computer readable medium, storing thereon a software product executable by a processor to perform The operations of:

indexing a plurality of documents, including compound documents to form a multimedia index to include a plurality of tokens, each token representing a distinct instance of data of one of the multimedia data types in one of the documents, each token indexed to a list of the documents containing an instance of the data, and for each of the documents indexed to a token;

processing a compound query, including at least two tokens of different multimedia data types, with respect to the index to selectively retrieve compound documents that satisfy the compound query by containing data corresponding to the instances of data represented by the tokens included in the compound query.

6. A computer implemented method for indexing documents, including compound documents, each of the compound documents having at least two different multimedia components, each multimedia component containing data of one of a plurality of multimedia data types, the method comprising:

for each document, and for each multimedia component within the document, processing the multimedia component to represent data including non-textual data contained in the multimedia component with at least one token, and for each token, determining reference data descriptive of the data represented by the token and providing a multimedia index comprising a plurality of tokens, each token indexed to a list of documents, each document in the list including data represented by the token.

7. The method of claim 6, wherein the multimedia data types include text data type, image data type, audio data type, and video data type.

8. The method of claim 6, where for tokens representing data of a selected multimedia data type, the reference data further comprises additional descriptive information of the data, and specific to the multiple media data type.

9. The method of claim 6, wherein processing a multimedia component comprises:

processing the multimedia component to identify each instance of a date; and for each instance of a date, representing the instance of the date with a token which represents a range of dates, and including the date in the reference data for the token representing the range of dates.

10. The method of claim 6, wherein the multimedia components include text components, and processing a text component comprises:
   processing the text component to identify each instance of a number; and
   for each instance of a number, representing the instance of the number with a token which represents a range of numbers including the value of the number, and including the value of the number in the reference data for the token representing the range of numbers.

11. The method of claim 6, wherein the multimedia components include image components, and processing an image component comprises:
   processing the image component to create at least one image histogram having a plurality of bins, each of the plurality of bins having a bin count;
   associating at least one of the plurality of bins with a respective token; and
   including the bin count of the at least one of the plurality of bins in the reference data for the respective token.

12. The method of claim 11, wherein the at least one image histogram is selected from the group consisting of color histograms, texture histograms, edge histograms, intensity histogram and gray-scale histograms.

13. The method of claim 6, wherein the multimedia components include image components, and processing an image component comprises:
   representing the image component with a single image token;
   processing the image multimedia component to create at least one image histogram; and
   including the at least one image histogram in the reference data of the single image token.

14. The method of claim 6, wherein the multimedia components include audio components containing audio recordings, and processing an audio component comprises:
   speech recognition processing the audio component to identify spoken words; and
   representing the identified spoken words with respective text tokens.

15. The method of claim 14, further comprising:
   including in the reference data for the respective text tokens time offsets of the identified spoken words in the audio component.

16. The method of claim 14, further comprising:
   speech recognition processing the audio component to identify spoken phonemes; and
   representing the identified spoken phonemes with respective text tokens.

17. The method of claim 6, wherein the multimedia components include audio components containing audio data, and processing an audio component comprises:
   processing the audio component to identify audio content; and
   representing the identified audio content with respective tokens descriptive of the audio content.

18. The method of claim 6, wherein the multimedia components include video components containing video sequences, and processing a video component comprises:
   extracting a plurality of image frames from the video component; and
   processing each of the extracted image frames as an image by associating the image with at least one token representative of non-textual data from the image, and including as reference data for each token a time offset of the image in the video multimedia component.

19. The method of claim 18, wherein processing a video multimedia component further comprises:
   extracting audio data from the video multimedia component; and
   processing the audio data by associating recognized spoken words in the audio data with text tokens representing the spoken words.

20. The method of claim 18, wherein processing a video multimedia component further comprises:
   extracting text data from the video multimedia component, and processing the text data by associating selected text data with text tokens representing the words.

21. The method of claim 6, wherein the multimedia components include video components containing video sequences, and processing a video multimedia component comprises:
   extracting image frames from the video component, and processing each of the extracted image frames as an image by associating the image with at least one token representative of non-textual data from the image, and including in the reference data for each token a time offset of the image in the video component;
   extracting audio data from the video component; and processing the audio by associating recognized spoken words in the audio with text tokens representing the spoken words;
   extracting text data from the video component, and processing the text data by associating selected text data with text tokens representing the words; and
   interleaving tokens from the image frames, the audio data and the text data of the video component into a sequence of tokens to represent the video component.

22. The method of claim 6, further comprising
   for each token in the multimedia index, the reference data includes at least one document offset of the data represented by the token.

23. The method of claim 22 wherein for each token representing data of at least one selected multimedia data type, the reference data further comprise a position of an instance of the data within a multimedia component.

24. The method of claim 22, wherein for each token representing audio data, the token in the multimedia index is a text string that represents an instance of a recorded speech within an audio component of a compound document and the reference data includes a time offset of the instance of the recorded speech within the audio component.

25. The method of claim 22, wherein the reference data for an audio token includes a confidence factor indicative of the likelihood that the audio token representing a word correctly corresponds to a recorded word in an audio component.

26. The method of claim 22, wherein the reference data for a token representing an image includes data from at least one histogram descriptive of visual characteristics of the image.

27. The method of claim 22, wherein the reference data for a token representing data in a video multimedia component includes data from at least one histogram of an image from the video multimedia component, and a time offset of the image in the video component.

28. The method of clam 6, wherein all of the multimedia data types are represented by a single, common type of tokens in the multimedia index.

29. The method of claim 28, wherein all of the multimedia data types are represented by text tokens, and data from a multimedia component other than text data is associated with information specific the type of the other data.

30. A computer implemented method for retrieving documents, including compound documents, each of the compound documents including at least two different multimedia components, each multimedia component having data of one of a plurality of multimedia data types, the method comprising:

receiving a compound query including at least one non-textual multimedia query component;

processing the compound query to generate a query structure comprising a set of tokens, including at least one token representing a non-textual multimedia data type; and evaluating the query structure with respect to a multimedia index to selectively retrieve compound documents that satisfy the compound query, each retrieved compound document including data represented by at least one token generated from the compound query.

31. The method of claim 30, wherein the multimedia index comprises a plurality of tokens, each token indexed to a list of documents including data represented by the token, each listed document associated with reference data comprising information derived from the data represented by the token.

32. The method of claim 30, wherein processing the compound query comprises:

processing each of the multimedia query components according to its data type to produce at least one token representative of the multimedia query component.

33. The method of claim 30, further comprising:

for at least one multimedia query component, and for at least one token produced from the multimedia query component, determining reference data comprising information descriptive of the data represented by the token.

34. The method of claim 30, further comprising:

for at least one multimedia query component, expanding at least one token produced from the multimedia query component to include in the query structure at least one other token similar to the at least one token.

35. The method of claim 34, further comprising:

determining a measure of similarity between the at least one token and the at least one other token for including in reference data for the at least one other token.

36. The method of claim 30, wherein the compound query includes an image query component, and processing the image query component comprises:

processing the image query component to produce at least one initial token representing at least one image attribute of the image query component; and expanding the at least one initial token to include in the query structure at least one other token associated with the image attribute of the image query component.

37. The method of claim 30, wherein the compound query includes an audio query component, and processing the audio query component comprises:

processing the audio query component to produce at least one initial token representing an recorded speech in the audio query component;

expanding the at least one initial token to include in the query structure at least one other token representing phonemes of the recorded speech represented by the at least one initial token; and determining reference data comprising a similarity measure for the at least one other token.

38. The method of claim 30, wherein the compound query includes an least one text query component, the method further comprising:

for at least one text query component, expanding at least one text token produced from the text query component to include in the query structure at least one image token related to the text query component.

39. The method of claim 30, wherein the compound query includes an least one image query component, the method further comprising:

for at least one image query component, expanding at least one image token produced from the image query component to include in the query structure at least one text token related to the image query component.

40. The method of claim 30, further comprising:

for at least one query component, expanding a first token produced from the query component to include in the query structure a second token related to the query component and having a different data type the first token.

41. The method of claim 30, further comprising:

for each multimedia query component, combining the at least one token produced from the multimedia query component into a substructure including the at least one token and at least one query operator; and combining each of the substructures into a query structure.

42. The method of claim 30, wherein the multimedia index includes position information, and evaluating the query structure comprising:

evaluating the query structure with respect to the multimedia index a first time to selectively retrieve candidate documents that satisfy the compound query by determining a document score for each of a number of documents based only on a presence or absence of tokens from the query structure in the document, and selecting a number of best scoring documents as the candidate documents; and evaluating the query structure with respect to the multimedia index a second nine by computing a final document score of each candidate document as a function of the position of each token from the query structure in the candidate document, using the position information from the multimedia index.

43. The method of claim 42, wherein the reference data in the query structure and the reference data in the multimedia index comprise image histograms.

44. The method of claim 30, wherein:

the multimedia index comprises tokens indexed to a list of documents and reference data associated with each listed document; and wherein processing the compound query comprises:

determining reference data for at least one of the generated tokens of the query structure; and including the reference data in the query structure; and wherein evaluating the query structure comprises:

evaluating the query structure with respect to the multimedia index a first time to selectively retrieve candidate documents that satisfy the compound query by determining a document score for each of a number of documents based only on a presence or absence of tokens from the query structure in the document, and selecting a number of best scoring documents as the candidate documents; and evaluating the query structure with respect to the multimedia index a second time by computing a final document score of each candidate document based on a comparison of the reference data in the query structure with the reference data in the multimedia index.

45. A computer implemented method for indexing documents, including compound documents containing both text and at least one image, each image having a position within the document, the method comprising:

for each document including at least one image, processing selected images to represent data in the images with at least one image token, and for each image token, determining reference data comprising the position of the image within the document;

for each document including text, processing the text to represent the text with text tokens, and for each text token, determining reference data comprising the position of the text token in the document;

providing a multimedia index comprising a plurality of text tokens and image tokens, each one of the plurality of text tokens and image tokens indexed to a list of documents, each document in the list including data represented by the one of the plurality of text tokens and image tokens; and for each one of the plurality of text tokens and image tokens, storing in the index the reference data comprising at least one position of the data represented by the one of the plurality of text tokens and image tokens in at least one document.

46. A computer implemented method for retrieving documents, including compound documents containing both text and at least one image, each image having a predetermined position within the document, the method comprising:

receiving a compound query including text and at least one image;

processing the compound query to generate a query structure including at least one token representing the text, at least one token representing the image, and at least one search operator defining a logical or proximity relationship between the text and the image; and evaluating the query structure with respect to a multimedia index to selectively retrieve compound documents that satisfy the compound query, the multimedia index comprising a plurality of tokens representing texts and images, each of the tokens representing text associated with a text string, each of the tokens representing an image associated with an image feature and with reference data specifying at least a position of the image represented by the token within at least one compound document including the image, each token indexed to a list of documents including the data represented by the token.

47. A computer implemented method for retrieving documents, including compound documents, each compound document including data of at least two different multimedia data types, the method comprising:

receiving a query comprising at least one query component of a multimedia data type;

processing each query component to produce at least one initial token representing data in the query component; and for at least one query component, and for at least one initial token produced from the query component, expanding the query to include in the query structure at least one other token of a multimedia data type different from that of the initial token, the at least one other token being related to the data in the query component.

48. An article of manufacture, comprising:

a computer readable medium, storing thereon a plurality of modules executable by a processor, and including:

a multimedia component separation module that receives a document, and separates the document into an ordered set of multimedia components;

a first pre-processing module that receives the at least one multimedia component having a first multimedia data type for producing at least one token representing multimedia data in the received multimedia components of the first multimedia data type;

a second pre-processing module that receives the multimedia components having a second multimedia data type different from the first multimedia data type for producing at least one token representing multimedia data in the received multimedia components of the second multimedia data type; and a multimedia indexer that receives respectively from the first pre-processing module and second pre-processing module tokens, and indexes in a multimedia index each received token to at least one document including data represented by the token.

49. The article of manufacture of claim 48, wherein the first multimedia data type is text, and the first pre-processing nodule generates text tokens representing text data.

50. The article of manufacture of claim 48, wherein the second multimedia data type is image, and the second pre-processing module generates tokens representing image data.

51. The article of manufacture of claim 48, wherein the second multimedia data type is audio, and the second pre-processing module generates tokens representing audio data.

52. The article of manufacture of claim 48, wherein the first multimedia data type is text, and the first pre-processing module generates text tokens representing text data, and the second multimedia data type is audio, and the second pre-processing module generates text tokens representing audio data, and the multimedia indexer indexes the text tokens from the first and second pre-processing module in the multimedia index.

53. An article of manufacture for retrieving documents that satisfy a compound query, with readable to a multimedia index, the article comprising:

a computer readable medium, storing thereon a plurality of modules executable by a processor, and including:

a query separation module that receives the compound query and separates the query into multimedia query components, each multimedia query component having a data type;

a query pre-processing module that produces a set of query tokens from the multimedia query components;

a query structuring module that structures the set of query tokens into an query structure; and a query execution module that processes the query structure with respect to a multimedia index to selectively identify documents that satisfy the compound query.

54. An article of manufacture for indexing documents in a multimedia index, comprising:

a computer readable medium, storing thereon a multimedia index comprising a plurality of tokens, each token representing data of one of a plurality of multimedia data types, each token indexed to a list of documents including the data, and storing thereon a software product executable by a processor to perform the operation of:

indexing a plurality of documents, including compound documents, to update the multimedia index by adding tokens, including nontextual tokens, to the multimedia index, each added token representing data of one of the plurality of multimedia data types in at least one of the plurality of documents, each token indexed to a list of documents including the data.

55. The article of manufacture of clam 54, wherein the multimedia index includes tokens representing a plurality of multimedia data types including text data type, image data type, audio data type and video data type.

56. The article of manufacture of claim 54, wherein for each token and for each document on the list of documents including the data represented by the token, the multimedia index further includes reference data comprising at least one document offset of the data represented by the token.

57. The article of manufacture of claim 54, wherein for each token representing data of at least one selected multimedia data type, the reference data further comprise at least one position of an instance of the data represented by the token within a multimedia component.

58. The article of manufacture of claim 54, wherein for each of the tokens representing audio data type, the token in the multimedia index that represents an instance of a recorded speech within an audio component of a compound document and includes a time offset of the instance of recorded speech within the audio component.

59. The article of manufacture of claim 58, wherein the tokens representing audio data are text strings.

60. The article of manufacture of claim 54, wherein the reference data for a token includes data specific to the type of data represented by the token.

61. The article of manufacture of claim 54, wherein the reference data for an audio token includes a confidence factor indicative of the likelihood that the audio token representing a word correctly corresponds to a recorded word in an audio component.

62. The article of manufacture of claim 54, wherein the reference data for a token representing an image includes data from at least one histogram descriptive of visual characteristics of the image.

63. The article of manufacture of claim 54, wherein the reference data for a token representing data in a video multimedia component includes a time offset of the image in the video multimedia component.

64. The article of manufacture of claim 54, wherein all of the multimedia data types are represented by a single, common type of token in the multimedia index.

65. The article of manufacture of claim 54, wherein all of the multimedia data types are represented by text tokens, and data from a multimedia component other than text data is associated with information specific to a type of the data of the multimedia component.

66. The article of manufacture of claim 54, wherein the software product indexes a multimedia document by:

separating the document into an ordered plurality of multimedia components, each component having a data type;

processing selected multimedia components to produce at least one token representing data included in the selected multimedia component;

determining reference data for each produced token, the reference data comprising a position of the data represented by the token in the document; and for each produced token, updating the multimedia index to associate the document with the token, and storing the reference data for the token in association with the token and the document.

67. An article of manufacture for retrieving documents that satisfy a compound query, with respect to a multimedia index, the article comprising:

a computer readable medium, storing thereon the multimedia index comprising a plurality of tokens, each token representing data of one of at plurality of multimedia data types, each token indexed to a list of documents including the data represented by the token, and storing thereon a software product executable by a processor to perform the operation of:

processing the compound query, including at least two query components of different multimedia data types, with respect to the multimedia index to selectively retrieve compound documents that satisfy the compound query.

68. The article of manufacture of claim 67, wherein the software product processes a compound query by:

separating the query into query components, each component having a multimedia data type;

processing selected query components according to its multimedia data type to produce at least one token representative of data in the multimedia component;

combining the produced tokens with query operators to form a query structure; and processing the query structure with respect to the multimedia index to selectively retrieve documents satisfying the compound query, the selected documents including data represented by the tokens of the compound query.

* * * * *